(12) United States Patent
You et al.

(10) Patent No.: US 12,338,298 B2
(45) Date of Patent: Jun. 24, 2025

(54) WAXY MAIZE STARCHES AND METHODS OF MAKING AND USING THEM

(71) Applicant: TATE & LYLE INGREDIENTS AMERICAS LLC, Hoffman Estates, IL (US)

(72) Inventors: Zheng You, Hoffman Estates, IL (US); Yuqing Zhou, Hoffman Estates, IL (US); Kevin Kovach, Hoffman Estates, IL (US); Jonathan Hopwood, Hoffman Estates, IL (US); Judith Whaley, Hoffman Estates, IL (US)

(73) Assignee: Tate & Lyle Ingredients Americas LLC, Hoffman Estates, IL (US)

( * ) Notice: Subject to any disclaimer, the term of this patent is extended or adjusted under 35 U.S.C. 154(b) by 457 days.

(21) Appl. No.: 17/631,464

(22) PCT Filed: Aug. 7, 2020

(86) PCT No.: PCT/US2020/045324
§ 371 (c)(1),
(2) Date: Jan. 29, 2022

(87) PCT Pub. No.: WO2021/030167
PCT Pub. Date: Feb. 18, 2021

(65) Prior Publication Data
US 2022/0275110 A1    Sep. 1, 2022

Related U.S. Application Data

(60) Provisional application No. 62/885,042, filed on Aug. 9, 2019.

(51) Int. Cl.
| | |
|---|---|
| C08B 30/12 | (2006.01) |
| A23K 20/163 | (2016.01) |
| A23L 5/10 | (2016.01) |
| A23L 29/212 | (2016.01) |

(52) U.S. Cl.
CPC ............ C08B 30/12 (2013.01); A23K 20/163 (2016.05); A23L 5/13 (2016.08); A23L 29/212 (2016.08); *A23V 2002/00* (2013.01); *C12Y 302/01001* (2013.01); *C12Y 302/0106* (2013.01); *C12Y 302/01098* (2013.01); *C12Y 302/01116* (2013.01)

(58) Field of Classification Search
CPC ....... A23L 29/212; A23L 5/13; A23K 20/163; A23V 5/13; C08B 30/12; C12Y 302/01001; C12Y 302/0106; C12Y 302/01098; C12Y 302/01116
See application file for complete search history.

(56) References Cited

U.S. PATENT DOCUMENTS

| | | | |
|---|---|---|---|
| 3,578,498 A | 5/1971 | Kite et al. | |
| 4,445,938 A * | 5/1984 | Verwaerde | ............. C12P 19/20 127/29 |
| 5,932,017 A | 8/1999 | Chiu | |
| 5,954,883 A | 9/1999 | Nagle et al. | |
| 11,129,402 B2 | 9/2021 | Whaley | |
| 11,896,038 B2 | 2/2024 | Whaley | |
| 2001/0017133 A1 | 8/2001 | Chiu | |
| 2003/0108649 A1 | 6/2003 | Jeffcoat | |
| 2005/0159329 A1 | 7/2005 | Fuertes et al. | |
| 2006/0172055 A1 | 8/2006 | Fryirs | |
| 2006/0257977 A1 * | 11/2006 | Hamaker | ................ C08B 30/18 435/96 |
| 2009/0017186 A1 | 1/2009 | Henault-Mezaize | |
| 2009/0311408 A1 | 12/2009 | Yildiz | |
| 2012/0045564 A1 | 2/2012 | Tachibe | |
| 2013/0189420 A1 | 7/2013 | Tachibe | |
| 2018/0258191 A1 * | 9/2018 | Derez | ..................... A23L 29/03 |
| 2019/0380370 A1 | 12/2019 | Whaley | |
| 2021/0392930 A1 | 12/2021 | Whaley | |

FOREIGN PATENT DOCUMENTS

| | | |
|---|---|---|
| EP | 1314742 A1 | 5/2003 |
| EP | 2014177 B1 | 12/2012 |
| JP | 2012223146 A | 11/2012 |
| JP | 2013034414 A | 2/2013 |

(Continued)

OTHER PUBLICATIONS

Keitthaison et al. J. Food Sci. Technology. Oct. 2015. 52 (10): 6529-6537.*
Ren et al. "Pasting and thermal properties of waxy corn starch modified by 1,4-alpha-glucan branching enzyme." International Journal of Biological Macromolecules, 2017, vol. 97, pp. 679-698.
Sorndech et al. "Structure of branching enzyme- and amylomaltase modified starch produced from well-defined amylose to amylopectin substrates." Carbohydrate Polymers, 2016, vol. 152, pp. 51-61.
Combined Search and Examination Report of UK Patent Application No. GB1913282.8, mailed Feb. 28, 2020, 8 pages.
Bijttebier A et al. "Hydrolysis of amylopectin by amylolytic enzymes: structural analysis of the residual amylopectin population." Carbohydrate Research, 2010, vol. 345, No. 2, pp. 235-242.

(Continued)

*Primary Examiner* — Anthony J Weier
(74) *Attorney, Agent, or Firm* — McDonnell Boehnen Hulbert & Berghoff LLP

(57) ABSTRACT

The present disclosure relates to waxy maize starches having desirably high process stability, and to methods relating to them, including methods for making and using them. One aspect of the disclosure is a waxy maize starch having an amyiopectin content in the range of 90-100%; wherein the amyiopectin fraction of the waxy maize starch has at least 28.0% DP3-12 branches; and no more than 53.0% DP 13-24 branches, no more than 16.0% DP 25-36 branches. Such waxy maize starches can be advantaged over conventional waxy maize starches in that they can have increased process stability, especially with respect to freeze-thaw stability. Methods of making the starch materials, using exo-hydrolyzing enzymes and methods of using the starch materials in food products are also described.

20 Claims, 5 Drawing Sheets

(56) References Cited

FOREIGN PATENT DOCUMENTS

| | | | |
|---|---|---|---|
| JP | 2013110997 A | | 6/2013 |
| WO | 1996004315 A1 | | 2/1996 |
| WO | 2003075681 A1 | | 9/2003 |
| WO | 2004/066955 A2 | | 8/2004 |
| WO | 2006009528 A1 | | 1/2006 |
| WO | 2013173161 A1 | | 11/2013 |
| WO | 2015132825 A1 | | 9/2015 |
| WO | WO2018112383 | * | 6/2018 |
| WO | WO-2018112383 A1 | * | 6/2018 ............ A23K 10/30 |

OTHER PUBLICATIONS

International Search Report and Written Opinion of International Patent Application No. PCT/US2020/045324, mailed Nov. 9, 2020, 10 pages.

Drummond et al. "A General Method for Distinguishing Between Endo and Exo Actions of Carbohydrases," FEBS Letts., 1971, vol. 15, No. 4, pp. 302-304.

Combined Search and Examination Report, U.K. Patent Application GB1707746.2, dated Sep. 17, 2017.

Ceballos et al., "Discovery of an amylase-free starch mutant in cassava (Manihot esculenta Crantz)," J. Agric. Food Chem., 55, 7469-76 (2007).

International Search Report for International Application PCT/US2017/066755 mailed on Jun. 6, 2018, 16 pages.

Rolland-Sabaté al. "Molecular and supra-molecular structure of waxy starches developed from cassava (Manihot esculenta Crantz)". Carbohydrate Polymers, 92, 1451-1462 (2013).

T. Sanchez et al., "Comparison of Pasting and Gel Stabilities of Waxy and Normal Starches from Potato, Maize, and Rice with Those of a Novel Waxy Cassava Starch under Thermal, Chemical and Mechanical Stress," J. Agric. Food Chem., 58, 5093-99 (2010).

Sanz et al., "Effect of thermally inhibited starches on the freezing and thermal stability of white sauces: Rheological and sensory properties", LWT—Food Science and Technology, vol. 67, Nov. 30, 2015, pp. 82-88.

* cited by examiner

Clarity 3    Clarity 7    Clarity 11

Syneresis 3    Syneresis 7    Syneresis 15

Procedure: Hold a plastic spoon at 45 degree. Do not poke the starch. Use the back of the spoon to gently press the starch about half way down and observe from the side how much clear water is squeezed out.

50 microns 50 microns

WAXY MAIZE STARCHES AND METHODS OF MAKING AND USING THEM

CROSS REFERENCE TO RELATED APPLICATION

This application is a U.S. National Phase of International Application No. PCT/US2020/045324, filed Aug. 7, 2020, which claims priority to U.S. Provisional Patent Application No. 62/885,042, filed Aug. 9, 2019, both of which are incorporated by reference herein in their entirety.

BACKGROUND OF THE DISCLOSURE

Field of the Disclosure

The present disclosure relates generally to starch products. More particularly, the present disclosure relates to waxy maize starches having desirably high process stability, and to methods relating to them, including methods for making and using them.

Technical Background

Waxy maize starches are starches derived from maize (also known as corn) that have a high percentage of their polysaccharide content in the form of amylopectin, i.e., as opposed to a mixture of amylopectin and amylose as in non-waxy starches. Waxy maize starch can provide a number of desirable properties to various foods. For example, waxy maize starches can provide desirable texture and thickness to foods, such as bakery fillings (e.g., fruit fillings for pies), batters, breadings, sauces such as cheese sauces and gravies. Waxy maize starches typically provide a higher viscosity than the corresponding non-waxy maize starches.

Waxy maize is a common and desirably inexpensive source for starch. However, waxy maize starch can be disadvantaged in that waxy maize starches have a strong propensity to retrograde, e.g., after prolonged storage time, at cold temperatures, and after one or more freeze-thaw cycles. Thus, waxy maize starches are often not able to retain desirable textural and rheological stability over a long shelf life, especially under refrigerated and/or freeze-thaw conditions. Chemical modification to produce hydroxypropylated starch or acetylated starch, and/or crosslinking with adipate or phosphate is often necessary to provide a starch with the desired stability for food uses. But high degrees of chemical modification are not always desirable. And in some contexts, chemical modification is viewed by consumers as undesirable.

Thus, there remains a need for ways to provide waxy maize starches with improved storage stability.

SUMMARY OF THE DISCLOSURE

One aspect of the disclosure is a waxy maize starch having
an amylopectin content in the range of 90-100%;
wherein the amylopectin fraction of the waxy maize starch has
at least 26.0% DP3-12 branches; and
no more than 53.0% DP13-24 branches.
In certain such embodiments, the amylopectin fraction of the waxy maize starch has no more than 19.0% DP25-36 branches, e.g., no more than 18.5%, or no more than 18.0%, or no more than 17.5%, or no more than 17.0%, or no more than 16.5%. In certain embodiments, the amylopectin fraction of the waxy maize starch has no more than 16.0% DP 25-36 branches. The present inventors have determined that such waxy maize starches can be advantaged over conventional waxy maize starches in that they can have increased process stability, especially with respect to freeze-thaw stability.

Another aspect of the disclosure is a waxy maize starch having an amylopectin content of 90-100%; (for example, a waxy maize starch as described with respect to any of claims 1-26 below), wherein the amylopectin fraction has
a DP3-12 value that is at least 1.0 percentage point greater than the DP3-12 value for native waxy maize starch, and
a DP13-24 value that is at least 1.0 percentage point less than the DP13-24 value for native waxy maize starch.
In certain such embodiments, the amylopectin traction has a DP25-36 value that is at least 0.5 percentage points less than the DP25-36 value for native waxy maize starch.

In certain desirable aspects of the disclosure, the starches are inhibited, e.g., having a sedimentation volume of less than 70 mL/g, for example, less than 60 mL/g or less than 50 mL/g, e.g., in the range of 10-70 mL/g, or 10-60 mL/g or 10-50 mL/g. However, in other aspects, the starches of the disclosure need not be inhibited; even non-inhibited starches having the branch chain length distributions described herein can have improved storage stability.

And in certain desirable aspects of the disclosure, the starches have a weight-average molecular weight of at least 800,000 Da. The present inventors have determined that a high molecular weight starch (i.e., as opposed to a dextrin or other lower molecular weight glucan fraction) having the branch length distribution described here can be especially desirable as a texturant, as it has improved freeze-thaw stability.

Another aspect of the disclosure is a method for providing a waxy maize starch, e.g., a waxy maize starch as described herein. The method includes providing a waxy maize starch and treating the waxy maize starch with an exo-hydrolyzing enzyme, such as beta amylase or maltogenic alpha amylase. For example, the method can be performed under conditions to increase the DP3-12 value of the waxy maize starch by at least 1.0 percentage point (e.g., by at least 2.0, at least 3.0, or even at least 5.0 percentage points); to reduce the DP13-24 value of the waxy maize starch by at least 1.0 percentage point (e.g., by at least 2.0, at least 3.0, or even at least 5.0 percentage points). In certain such embodiments, the treatment of the waxy maize starch reduces the DP25-36 value of the waxy maize starch by at least 0.5 percentage points (e.g., by at least 1.0, at least 2.0 or even at least 3.0 percentage points). As described herein, the enzymatic methods described herein can be performed to provide a branch length distribution having relatively more shorter-length branch chains, without reducing the molecular weight of the material such that it is no longer a "starch" as commonly understood. The present inventors have determined that the use of exo-hydrolyzing enzymes can allow the starch to have improved stability while still maintaining texturizing properties.

Another aspect of the disclosure is a waxy maize starch made by a method as described herein.

Another aspect of the disclosure is a method for making a food product, comprising cooking a waxy maize starch as described herein in the presence of water, and providing the cooked starch in combination with one or more other food ingredients.

Another aspect of the disclosure is a food product including a waxy maize starch as described herein, e.g., in cooked form.

Other aspects of the disclosure will be evident from the detailed description provided herein.

DETAILED DESCRIPTION

Figure 1:
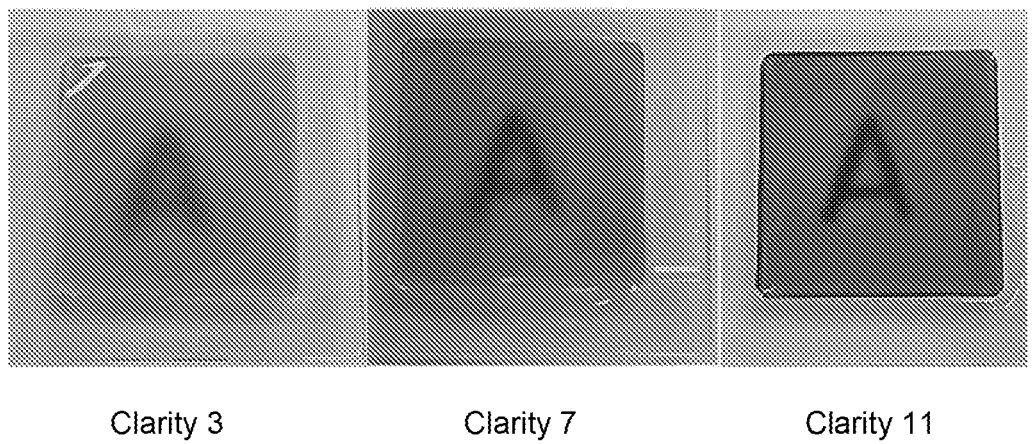
FIG. 1 is a photograph of standards for opacity used in the experiments described in the examples.

The branch chains of an amylopectin are the shorter chains that branch off of the longer, linear amylase backbone of an amylopectin. The present inventors have determined that waxy maize starches having certain branch chain length distributions can provide especially desirable properties. Accordingly, one aspect of the disclosure is a waxy maize starch having an amylopectin content in the range of 90-100%;
wherein the amylopectin fraction of the waxy maize starch has
at least 26.0% DP3-12 branches; and
no more than 53.0% DP13-24 branches.

In various embodiments, such starches can provide a non-cohesive, smooth texture when cooked out or gelatinized, and can exhibit tolerance to processing conditions (such as heat, shear, and/or extremes of pH) as well as rheological and textural stability over a desired shelf life, even under refrigerated and/or freeze/thaw conditions.

Such a branch chain length distribution is different than that of typical waxy maize starch. The present inventors have determined that by modifying the branch chain length distribution of a waxy maize starch, e.g., using the methods described herein, their properties can be significantly improved, especially with respect to stability. Notably, starches of the disclosure can be especially useful in that they have desirable stability characteristics (and, in some cases, are also inhibited), yet when not otherwise modified need not be labelled as "modified" starch. For example, the starches of the present disclosure can provide desirable freeze-thaw stability, desirable refrigerated storage stability, and/or desirable shelf stability.

The person of ordinary skill in the art will appreciate that various native starches have different relative amounts of the two major components of starch polysaccharides, amylose (a linear, alpha-1,4-linked polyglucoside) and amylopectin (a branched alpha-1,4-linked polyglucoside with alpha-1,6-linked branch points). So-called "waxy" starches have at least 90% amylopectin (i.e., of the total amount of amylose and amylopectin). Typical non-waxy starches have amounts of amylopectin in the range of 70-85%. In certain embodiments, the waxy maize starches as otherwise described herein have an amylopectin content in the range of 95-100%. In other embodiments, the waxy maize starches as otherwise described herein have an amylopectin content of at least 99%, or at least 99.9%. The high degree of amylopectin provides waxy maize starches with different properties than non-waxy maize starches, e.g., higher viscosity, formation of longer and more cohesive pastes, higher resistance retrogradation.

As the person of ordinary skill in the art will appreciate, different types of starches from different sources can have different textures and rheological properties, and thus can be desirable for use in different food applications. The present disclosure relates to waxy maize starch (i.e., derived from maize, also known as corn). The person of ordinary skill in the art will be able to distinguish different sources of starch, for example, via microscopy and comparison with standards. The person of ordinary skill in the art can, for example, view the starch materials under a microscope, optionally with dying with iodide, and use the size and the shape of the observed granules to determine the type of starch.

The waxy maize starches described herein desirably have a weight-average molecular weight of at least 800,000 Da. For example, in certain embodiments, the waxy maize starches can have a weight-average molecular weight of at least 1,000,000 Da, or at least 1,500,000 Da, or even at least 2,000,000 Da. Gel permeation chromatography with starch standards and crosslinked polystyrene/divinylbenzene stationary phases can using 5 mM sodium nitrate in DMSO as mobile phase can be used to determine molecular weight. Notably, the present inventors have determined that a high molecular weight starch (i.e., as opposed to a dextrin or other lower molecular weight glucan fraction) having the branch length distribution described here can be especially desirable as a texturant, as it has improved freeze-thaw stability. Of course, the enzymatic reactions described herein will form lower-molecular weight material, but this material can in some embodiments be removed from the starch product, e.g., by filtration and washing. The person of ordinary skill in the art can, based on the present disclosure, perform the enzymatic reactions without undue reduction of molecular weight.

Branch chain lengths are determined using debranching and HPAE-PAD (High-Performance. Anion-Exchange Chromatography with Pulsed Amperometric Detection) with valley-to-valley integration. In such method, branch chain length of an amylopectin fraction is measured by first exhaustively debranching the amylopectin using isoamylase (EC 3.2.1.68, from *Pseudomonas* sp. having an isoamylase activity on oyster glycogen of 240 U/mg, alpha amylase activity on reduced maltoheptose of less than 0.001 U/mg, maltase activity on maltose less than 0.001 and exo-alpha-glucanase activity on linear alpha-1,4-maltodextrins less than 0.000001 U/mg) at pH 4.0 and 45° C. for 16 hours. Fresh 100 mM pH 4.0 acetate solution (i.e., having been stored at 4° C. for no more than 5 days) is used in the debranching. Isoamylase can be purchased from Megazyme (Wicklow, Ireland). Specifically, the debranching is performed as follows:

1. Weigh 10 mg waxy starch into the bottom of a glass test tube (Fisher, #14-962-26G). Add 3 mL Milli-Q water and cap the test tube. Prepare duplicate samples.
2. Heat the test tubes with samples in boiling water for 1 h with interval swirling.
3. Cool the test tubes to room temperature. Add 2 mL pH 4.0 acetate buffer solution, mix well.
4. Add 10 μL isoamylase (5U), a star-shaped stir bar into each test tube, mix well and cap.
5. Incubate samples in 45° C. heating block with constant stirring for at least 16 hours.

6. Heat samples at 100° C. for 30 minutes to inactivate the enzyme.
7. Cool samples to 40° C., filter through 0.45 μm Nylon syringe filters into Autosampler vials.

Characterization of the debranched waxy starches is performed by HPAE-PAD (High-Performance. Anion-Exchange Chromatography with Pulsed Amperometric Detection) on a Dionex ICS-3000 (Dionex, Sunnyvale, CA). A Dionex CatoPac PA1 analytical column (4×250 mm) is used with a CarboPac PA2 guard column (4×50 mm). The eluents used for separation are 150 mM NaOH (Eluent A), and 150 mM NaOH containing 500 mM NaOAc (Eluent B), prepared in degassed 18 MΩ·cm water and then filtered through a 0.2 μm membrane filter. Unless otherwise indicated, the gradient programs for separation is as follows: 0~5 min 60% A, 5-20 min 60% to 40% A, 20 to 50 min 40% to 20% A, and 50 to 55 min 20% A. As the person of ordinary skill in the art will appreciate, "60% A" denotes an eluent mixture of 60% Eluent A and 40% Eluent B. The injection volume of sample solution is 10 μL. Each run was carried out at 30° C. with a flow rate of 1.2 mL/min. The working electrode is gold and the reference electrode is silver-silver chloride. The waveform is "Gold Standard PAD." The column is equilibrated and regenerated as follows: The system is equilibrated with 100% A for 30 min and then 60% A for at least 30 min before injection. Every five sample injections, the column is regenerated with 100% A for 30 min and then equilibrated with 60% A for 30 min, and then a 5 ppm DP1-7 mix standard solutions to check the retention times. Saccharide standards with degree of polymerization 1-7 can be purchased, e.g., from Sigma Aldrich.

To analyze the data in the valley-to-valley analytical method, peak area is calculated by integrating peaks by valley-to-valley. The chain length distribution is represented as a percentage of the total peak area from a degree of polymerization of 3 (i.e., DP3) to a degree of polymerization of 61 (i.e., DP53); the detector response varying with DP is disregarded. As the enzymatic treatments described herein can provide high mounts of maltose, DP2 chain branches are ignored. The chain length distributions between a d of polymerization of X and a degree of polymerization of Y (i.e., including the endpoints) are summed up and reported as "DPX-Y."

The present inventors have determined that it can be desirable to provide a wax maize starch having an amylopectin fraction having relatively high amounts of DP3-12 branch chains. Thus, as described above, the amylopectin fraction of the waxy maize starch can, in one desirable aspect of the disclosure, nave at, least 26.0% DP3-DP12 branches. For example, in certain embodiments as otherwise described herein, the amylopectin fraction of the waxy maize starch has in the range of 26.0-55.0% DP3-12 branches, e.g., in the range of 26.0-52.5%, or in the range of 26.0-50.0%, or in the range of 26.0-47.5%, or in the range of 26.0-43.0%. In certain embodiments as otherwise described herein, the amylopectin fraction of the waxy maize starch has at least 26.5% DP3-12 branches, e.g., in the range of 26.5-55.0%, or in the range of 26.5-52.5%, or in the range of 26.5-50.0% or in the range of 26.5-47.5%, or in the range of 26.5-43.0%. In certain embodiments as otherwise described herein, the amyiopectin fraction of the waxy maize starch has at least 27.5% DP3-12 branches, e.g., in the range of 27.5-55.0%, or in the range of 27.5-52.5%, or in the range of 27.5-50.0%, or in the range of 27.5-47.5%, or in the range of 27.5-43.0%. In certain embodiments as otherwise described herein, the amylopectin fraction of the waxy maize starch has at least 29.0% DP3-12 branches, e.g., in the range of 29.0-55.0%, or in the range of 29.0-52.5%, or in the range of 29.0-50.0%, or in the range of 29.0-47.5%, or in the range of 29.0-43.0%. In certain embodiments as otherwise described herein, the waxy maize starch has at least 32.0% DP3-12 branches, e.g., in the range of 32.0-55.0%, or in the range of 32.0-52.5%, or in the range of 32.0-50.0%, or in the range of 32.0-47.5%, or in the range of 32.0-43.0%. Based on the present specification, the person of ordinary skill in the art will arrive at a desired relative amount of DP3-12 branch chains.

The branch chains of DP3-12 can be subdivided into two fractions, DP3-5 and DP6-12. The inventors believe that the amylopectin fraction of the waxy maize starches as described herein also includes DP2 branch chains. However, these are difficult to measure accurately due to the formation of maltose (i.e., DP2 maltooligosaccharide) by the enzymatic treatment; accordingly, any DP2 branches are not considered in the branch chain length distribution analysis.

Based on the present specification, the person of ordinary skill in the art will arrive at a desired relative amount of DP6-12 branch chains. For example, in certain embodiments as otherwise described herein, the amylopectin fraction of the waxy maize starch has at least 24.0% DP6-12 branches, e.g., in the range of 24.0-35.0%, or in the range of 24.0-34.0%, or in the range of 24.0-33.0%, or in the range of 24.0-32.0%, or in the range of 24.0-31.0%, or in the range of 24.0-30. In certain embodiments as otherwise described herein, the amylopectin fraction of the waxy maize starch has at least 24.5% DP6-12 branches, e.g., in the range of 24.5-35.0%, or in the range of 24.5-34.0%, or in the range of 24.5-33.0%, or in the range of 24.5-32.0%, or in the range of 24.5-31.0%, or in the range of 24.5-30.0%. In certain embodiments as otherwise described herein, the amylopectin fraction of the waxy maize starch has at least 25.0% DP6-12 branches, e.g., in the range of 25.0-35.0%, or in the range of 25.0-34.0%, or in the range of 25.0-33.0%, or in the range of 25.0-32.0%, or in the range of 25.0-31.0%, or in the range of 25.0-30.0%. In certain embodiments as otherwise described herein, the amylopectin fraction of the waxy maize starch has at least 26.0% DP6-12 branches, e.g., in the range of 26.0-35.0%, or in the range of 26.0-34.0%, or in the range of 26.0-33.0%, or in the range of 26.0-32.0%, or in the range of 26.0-31.0%, or in the range of 26.0-30.0%. In certain embodiments as otherwise described herein, the amylopectin fraction of the waxy maize starch has at least 27.5% DP6-12 branches, e.g., in the range of 27.5-35.0%, or in the range of 27.5-34.0%, or in the range of 27.5-33.0%, or in the range of 27.5-32.0%, or in the range of 27.5-31.0%, or in the range of 27.5-30.0%. In certain embodiments as otherwise described herein, the amylopectin fraction of the waxy maize starch has at least 29.5% DP6-12 branches, e.g., in the range of 29.5-35.0%, or in the range of 29.5-34.0%, or in the range of 29.5-33.0%, or in the range of 29.5-32.0%, or in the range of 29.5-31.0%.

Based on the present specification, the person of ordinary skill in the art will arrive at a desired relative amount of DP3-5 branch chains. For example, in certain embodiments as otherwise described herein, the amylopectin fraction of the waxy maize starch has at least 1.0% DP3-5 branches, e.g., in the range of 1.0-33.0%, or in the range of 1.0-30.0%, or in the range of 1.0-25.0%, or in the range of 1.0-20.0%. In certain embodiments as otherwise described herein, the amylopectin fraction of the waxy maize starch has at least 3.0% DP3-5 branches, e.g., in the range of 3.0-33.0%, or in the range of 3.0-30.0%, or in the range of 3.0-25.0%, or in the range of 3.0-20.0%. In certain embodiments as otherwise described herein, the amylopectin fraction of the waxy maize starch has at least 5.0% DP3-5 branches, e.g., in the range of 5.0-33.0%, or in the range of 5.0-30.0%, or in the range of 5.0-25.0%, or in the range of 5.0-20.0%. In certain embodiments as otherwise described herein, the amylopectin fraction of the waxy maize starch has at least 10.0% DP3-5 branches, e.g., in the range of 10.0-33.0%, or in the range of 10.0-30.0%, or in the range of 10.0-25.0%, or in the range of 10.0-20.0%.

Similarly, the present inventors have determined that it can be desirable to provide a waxy maize starch having are amylopectin fraction having relatively low amounts of DP13-24 branch chains. Thus, as described above, the amyiopectin fraction of the waxy maize starch can, in one desirable aspect of the disclosure, have no more than 53.0% DP13-24 branches. For example, in certain embodiments as otherwise described herein, the amylopectin fraction of the waxy maize starch has in the range of 15.0-53.0% DP13-24 branches, e.g., in the range of 20.0-53.0%, or in the range of 25.0-53.0%, or in the range of 30.0-53.0%. In certain embodiments as otherwise described herein, the amylopectin fraction of the waxy maize starch has no more than 51.0% DP13-24 branches, e.g., in the range of 15.0-51.0%, or in the range of 20.0-51.0%, or in the range of 25.0-51.0%, or in the range of 30.0-51.0% in certain embodiments as otherwise described herein, the amylopectin fraction of the waxy maize starch has no more than 50.0% DP13-24 branches, e.g., in the range of 15.0-50.0%, or in the range of 20.0-50.0%, or in the range of 25.0-50.0%, or in the range of 30.0-50.0%. in certain embodiments as otherwise described herein, the amylopectin fraction of the waxy maize starch has no more than 47.5% DP13-24 branches, e.g., in the range of 15.0-47.5%, or in the range of 20.0-47.5%, or in the range of 25.0-47.5%, or in the range of 30.0-47.5%. In certain embodiments as otherwise described herein, the waxy maize starch has no more than 43.0% DP13-24 branches, e.g., in the range of 15.0-43.0%, or in the range of 20.0-43.0%, or in the range of 25.0-43.0%, or in the range of 30.0-43.0%. In certain embodiments as otherwise described herein, the amylopectin fraction of the waxy maize starch has no more than 38.0% DP13-24 branches, e.g., in the range of 15.0-38.0%, or in the range of 20.0-38.0%, or in the range of 25.0-38.0%, or in the range of 30.0-38.0%. Based on the present specification, the person of ordinary skill in the art will arrive at a desired relative amount of DP13-24 branch chains.

Similarly, the present inventors have determined that it can be desirable to provide a waxy maize starch having an amylopectin fraction having relatively low amounts of DP25-36 branch chains. Thus, in certain embodiments as otherwise described herein, the amylopectin fraction of the waxy maize starch has no more than 19.0% DP25-36 branches, for example, no more than 18.5% DP25-36 branches, e.g., in the range of 5.0-19.0%, or in the range of 7.5-19.0%, or in the range of 10.0-19.0%, or in the range of 12.5-19.0%, or in the range of 5.0-18.5%, or in the range of 7.5-18.5%, or in the range of 10.0-18.5%, or in the range of 2.5-18.5%. In certain embodiments as otherwise described herein, the amylopectin fraction of the waxy maize starch has no more than 18.0% DP25-36 branches, for example, no more than 17.5% DP25-36 branches, e.g., in the range of 5.0-18.0%, or in the range of 7.5-18.0%, or in the range of 10.0-18.0%, or in the range of 12.5-18.0%, or in the range of 5.0-17.5%, or in the range of 7.5-17.5%, or in the range of 10.0-17.5%, or in the range of 12.5-17.5%. In certain embodiments as otherwise described herein, the amylopectin fraction of the waxy maize starch has no more than 17.0% DP25-36 branches, for example, no more than 16.5% DP25-36 branches, e.g., in the range of 5.0-17.0%, or in the range of 7.5-17.0%, or in the range of 10.0-17.0%, or in the range of 12.5-17.0%, or in the range of 5.0-16.5%, or in the range of 7.5-16.5%, or in the range of 10.0-16.5%, or in the range of 12.5-16.5%.

The amylopectin fraction of the waxy maize starch can, in certain embodiments of the disclosure, have no more than 16.0% DP25-36 branches. For example, in certain embodiments as otherwise described herein, the amylopectin fraction of the waxy maize starch has in the range of 5.0-16.0% DP25-36 branches, e.g., in the range of 7.5-16.0%, or in the range of 10.0-16.0%, or in the range of 12.5-16.0%. In certain embodiments as otherwise described herein, the amylopectin fraction of the waxy maize starch has no more than 15.5% DP25-36 branches, e.g., in the range of 5.0-15.5%, or in the range of 7.5-15.5%, or in the range of 10.0-15.5%, or in the range of 12.5-15.5%. In certain embodiments as otherwise described herein, the amylepectin fraction of the waxy maize starch has no more than 15.0% DP25-36 branches, e.g., in the range of 5.0-15.0%, or in the range of 7.5-15.0%, or in the range of 10.0-15.0%, or in the range of 12.5-15.0%. In certain embodiments as otherwise described herein, the amyiopectin fraction of the waxy maize starch has no more than 13.5% DP25-36 branches, e.g., in the range of 5.0-13.5%, or in the range of 7.5-13.5%, or in the range of 10.0-13.5%, or in the range of 12.5-13.5%.

Notably, the present inventors have determined that it can be desirable to provide a waxy maize starch having a branch chain distribution that is different from that of a native waxy maize starch. For example, in certain embodiments as otherwise described herein, the amylopectin fraction of the waxy maize starch has a DP3-12 value that is at least 1.0 percentage point greater than the DP3-12 value for native waxy maize starch; and a DP13-24 value that is at least 1.0 percentage point less than the DP13-24 value for native waxy maize starch (and in certain such embodiments, a DP25-36 value that is at least 0.5 percentage points less than the DP25-36 value for native waxy maize starch). For example, in certain such embodiments, the amyiopectin fraction of the waxy maize starch has a DP3-12 value that is at least 2.0 percentage points greater than the DP3-12 value for native waxy maize starch; and a DP13-24 value that is at least 2.0 percentage points less than the DP13-24 value for native waxy maize starch (and in certain such embodiments, a DP25-36 value that is at least 1.0 percentage point less than the DP25-36 value for native waxy maize starch). In certain such embodiments, the amylopectin fraction of the waxy maize starch has a DP3-12 value that is at least 3.0 percentage points greater than the DP3-12 value for native waxy maize starch; and a DP13-24 value that is at least 3.0 percentage points less than the DP13-24 value for native waxy maize starch (and in certain such embodiments, a DP25-36 value that is at least 2.0 percentage points less than the DP25-36 value for native waxy maize starch). In certain such embodiments, the amylopectin fraction of the waxy maize starch has a DP3-12 value that is at least 5.0 percentage points greater than the DP3-12 value for native waxy maize starch; and a DP13-24 value that is at least 5.0 percentage points less than the DP13-24 value for native waxy maize starch (and in certain such embodiments, a DP25-36 value that is at least 3.0 percentage points less than the DP25-36 value for native waxy maize starch). As used herein, a "native waxy maize starch" is a starch that is derived from the endosperm of a waxy maize plant that does not contain a recessive sugary-2 ($su_2$) allele (i.e., as described in U.S. Pat. No. 5,954,883, which is hereby incorporated herein by reference in its entirety). Comparing branch chain length distribution values for the waxy maize starches of the disclosure with such values for comparative waxy maize starches provides an alternative method for identifying certain desirable starches. Notably, certain measurement artifacts can be controlled for when performing such a comparison.

The waxy maize starches described herein can be made with relatively little color. For example, certain embodiments of the waxy maize starches as otherwise described herein are relatively low in color, i.e., have a Yellowness Index of no more than 10, for example, in the range of 3-10 or 5-10. In certain desirable embodiments, the waxy maize starches described herein are especially low in color, i.e., the Yellowness Index is less than 8 (e.g., 3-8 or 5-8), Yellowness Index is determined via ASTM E313.

Notably, the waxy maize starches described herein can be made without many of the conventional chemical modifiers used in making conventional modified and/or inhibited starches. Accordingly, in certain desirable embodiments, the waxy maize starches as otherwise described herein can be marked or labelled as so-called "clean-label" starches. For example, in certain embodiments, a waxy maize starch as otherwise described herein is not hydroxypropylated. In certain embodiments, a waxy maize starch as otherwise described herein is not acetylated. In certain embodiments, a waxy maize starch as otherwise described herein is not carboxymethylated. In certain embodiments, a waxy maize starch as otherwise described herein is not hydroxyethylated. In certain embodiments, a waxy maize starch as otherwise described herein is not phosphated. In certain embodiments, a waxy maize starch as otherwise described herein is not succinated (e.g., not octenylsuccinated). In certain embodiments, a waxy maize starch as otherwise described herein is not cationic or zwitterionic.

Similarly, in certain embodiments the waxy maize starches described herein can be made without use of the cross-linkers typically used in the inhibition of starch. For example, in certain embodiments, a waxy maize starch as otherwise described herein is not crosslinked with phosphate (e.g., using phosphorus oxychloride or metaphosphate). In certain embodiments, a waxy maize starch as otherwise described herein is not crosslinked with adipate. In certain embodiments, a waxy maize starch as otherwise described herein is not crosslinked with epichlorohydrin. In certain embodiments, a waxy maize starch as otherwise described herein is not crosslinked with acrolein.

However, in other embodiments, one or more of the chemical modifications and/or inhibitions described above can be present in the starch. The stability of such chemically modified and/or inhibited waxy maize starches can be improved by providing them with the branch chain length distributions described herein.

And the waxy maize starches of the disclosure (e.g., having the yellowness values described above) can in certain embodiments be made without using other harsh chemical treatments common in the art. For example, in certain embodiments, a waxy maize starch as otherwise described herein is not bleached or oxidized with peroxide or hypochlorite. Of course, in other embodiments, peroxide or hypochlorite can be used to provide even better color to the waxy maize starches described herein.

In certain embodiments, the waxy maize starches of the disclosure can be made without dextrinization, and as such do not contain substantial amounts of the repolymerized branched chains typical of dextrins. Accordingly, in such embodiments, a waxy maize starch as otherwise described herein substantially lacks 1,2- and 1,3-branching (e.g., less than 1% of each). Such branching can be determined using nuclear magnetic resonance techniques familiar to the person of ordinary skill in the art.

The waxy maize starches of the present disclosure can have a variety of viscosities as measured by a Rapid Visa) Analyzer (RVA). For example, in certain embodiments a waxy maize starch as otherwise described herein can have a viscosity as measured by RVA is in the range of 50-1500 cP. In certain such embodiments, the viscosity as measured by RVA is in the range of 50-1000 cP, 50-850 cP, 50-700 cP, 50-500 cP, 50-400 cP, 50-300 cP, 50-200 cP, 100-1100 cP, 100-1000 cP, 100-850 cP, 100-700 cP, 100-500 cP, 100-400 cP, 100-300 cP, 200-1100 cP, 200-1000 cP, 200-850 cP, 200-700 cP, 200-500 cP, 400-1100 cP, 400-1000 cP, 400-850 cP, 400-700 cP, 600-1100 cP, or 600-850 cP, 700-1500 cP, or 700-1300 cP. The viscosity is measured by RVA at 5% solids in a pH 6.5 phosphate buffer at 1% NaCl at a stir rate of 160 rpm. The initial temperature of the analysis is 50 the temperature is ramped linearly up to 90° C. over 3 minutes, then held at 95 for 20 minutes, then ramped linearly down to 50° C. over 3 minutes, then held at 50° C. for 9 minutes, after which time the viscosity is measured. Notably, when a basting peak is displayed at times of about 2-5 minutes, the final viscosity measured is higher than the pasting peak viscosity. When the pasting peak is absent, the viscosity during the 95° C. hold is flat, or increases.

The wax maize starches of the disclosure can be provided in a variety of forms. For example, in certain embodiments, a waxy maize starch of the disclosure is pregelatinized; in such cases, a cooked starch can be used as a feed for an enzymatic process as described herein.

Certain desirable embodiments of the waxy maize starches as described herein are substantially digestible. For example, in certain embodiments of the waxy maize starches as otherwise described herein, the amount of fiber is less than 10% as determined by AOAC 2001.03. In certain such embodiments, the amount of fiber is less than 5% or even less than 2%.

In certain embodiments as otherwise described herein, the waxy maize starch of the disclosure is inhibited. As the person of ordinary skill in the art will appreciate, inhibition can help to provide process tolerance. Process-tolerant starches resist breaking down into fragments and resist dissolution when processed. Inhibited starches may vary with respect to their degree-of-inhibition, as characterized by their observed microscopy and sedimentation volume. Degree-of-inhibition can be assessed by cooking the starch in water (typically cook at 95° C. for 30 mins with hand stirring in the first 6 mins) and then observing the cook under microscope. Starches that have not been inhibited will have few granules and fragments, as they tend to dissolve in water during cooking. Starches that have been inhibited will show swollen intact particles under microscope, with starches that have been highly inhibited exhibit small and dark particles and starches that have been slightly inhibited exhibit large and light particles. Alternatively, degree-of-inhibition can be assessed through the measurement of sedimentation volume of the starch as described below.

Thus, in certain desirable embodiments, waxy maize starches of the disclosure substantially retain intact granules upon cooking. As, used herein, granularity is determined by cooking the starch at 5% solids in the salted buffer solution by suspending a container containing the slurry in a 95° C. water bath and stirring with a glass rod or metal spatula for 6 minutes, then covering the container and allowing the paste to remain at 95 for an additional 20 minutes, then allowing the paste to cool to room temperature. Following such cooking, swollen but intact granules can be observed microscopically. The person of ordinary skill in the art would understand that minor deviations from granularity are allowed. For example, in certain embodiments of the waxy maize starches as otherwise described herein, no more than 30 of the starch granules become non-intact upon cooking (i.e. as described above with respect to granularity). In certain such embodiments, no more than 20% or even no more than 10% of the starch granules become non-intact upon cooking (i.e., as described above with respect to granularity). The person of ordinary skill in the art can determine whether starch granules remain intact by viewing them under a microscope (e.g., with staining), as is conventional in the art.

When inhibited, the waxy maize starches of the disclosure can have a variety of sedimentation volumes, e.g., within the range of less than 50 mL/g, such as 10-50 mL/g. For example, in certain embodiments, a waxy maize starch as otherwise disclosed herein has a sedimentation volume in the range of 15-40 mL/g. In other embodiments, a waxy maize starch as otherwise disclosed herein has a sedimentation volume in the range of 18-35 mL/g. In various additional embodiments, a waxy maize starch as otherwise disclosed herein has a sedimentation volume in the range of 10-40 mL/g, or 10-35 mL/g, or 15-50 mL/g, or 15-35 mL/g, or 18-50 mL/g, or 18-40 mL/g. In still other embodiments, a waxy maize starch as otherwise disclosed herein has a sedimentation volume in the range of 10-45 mL/g, or 10-30 mL/g, or 10-25 mL/g, or 10-20 mL/g, or 15-45 mL/g, or 15-30 mL/g, or 15-25 mL/g, or 15-20 mL/g, or 20-50 mL/g, or 20-45 mL/g, or 20-40 mL/g, or 20-35 mL/g, or 20-30 mL/g, or 20-25 mL/g, or 25-50 mL/g, or 25-45 mL/g, or 25-40 mL/g, or 25-35 mL/g, or 25-30 mL/g, or 30-50 mL/g, or 30-45 mL/g, or 30-40 mL/g, or 30-35 mL/g, or 35-50 mL/g, or 35-45 mL/g, or 35-40 mL/g, or 40-50 mL/g. The person of ordinary skill in the art will appreciate that the sedimentation volume is a measure of the degree of inhibition of the starch, and will select a desired range of sedimentation volumes for a particular end use for the inhibited waxy maize starches described herein.

As used herein, sedimentation volume is the volume occupied by one gram of cooked starch (dry basis) in 100 grams (i.e. total, including the starch) of salted buffer solution. This value is also known in the art as "swelling volume." As used herein, the "salted buffer solution" refers to a solution prepared according to the following steps:
 a) Using a top loader balance, weigh out 20 grams of sodium chloride into a 2 liter volumetric flask containing a stir bar;
 b) To this add RVA pH 6.5 buffer (purchased from Ricca Chemical Company) so that the flask is at least half full;
 c) Stir to mix until sodium chloride is dissolved;
 d) Add additional RVA pH 6.5 buffer to a final volume of 2 liters;

Sedimentation volumes as described herein are determined by first cooking the starch at 5% solids in the salted buffer solution by suspending a container containing the slurry in a 95° C. water bath and stirring with a glass rod or metal spatula for 6 minutes, then covering the container and allowing the paste to remain at 95° C. for an additional 20 minutes. The container is removed from the bath and allowed to cool on the bench. The resulting paste is brought back to the initial weight by addition of water (i.e. to replace any evaporated water) and mixed well. 20.0 g of the paste (which contains 1.0 g starch) is weighted into a 100 mL graduated cylinder containing salted buffer solution, and the total weight of the mixture in the cylinder is brought to 100 g using the buffer. The cylinder is allowed to sit undisturbed for 24 hours. The volume occupied by the starch sediment (i.e., as read in the cylinder) is the sedimentation volume for 1 g of starch, i.e., in units of mL/g.

The inhibited granular starches of the disclosure desirably have relatively low solubles. Water can be used to wash away a substantial amount of the soluble fraction formed by hydrolysis, but the person of ordinary skill in the art will appreciate that some solubles will typically remain. And in some cases, washing is not necessary. In certain embodiments as otherwise described herein, the inhibited granular starch has no more than 25% solubles, e.g., no more than 22% solubles. In certain embodiments as otherwise described herein, the inhibited granular starch has no more than 20% solubles, e.g., no more than 18% solubles, or no more than 15% solubles. Solubles can be determined by measurement of the supernatant in the sedimentation volume test (1% solids) described above. Samples are acid treated and microwave digested to convert starch into glucose. The resulting solution is then neutralized with sodium hydroxide and brought to volume with a phosphate buffer. Glucose is then measured with an YSI 2700/2900 biochemistry analyzer, and the result correlated with solubles using the relevant volumes.

But in other embodiments, the starch is not inhibited. The stability of such uninhibited waxy maize starches can be improved by providing them with the branch chain length distributions described herein.

The waxy maize starches of the disclosure may be made using a variety of methodologies. A variety of waxy maize feedstocks can be used. The waxy starch feedstock can be pre-treated, for example, to reduce the amount of lipid and/or protein present in the starch, as is conventional in the art.

When inhibited, the waxy maize starch can be inhibited in a variety of ways. The inhibition can be performed, for example, before the enzymatic treatments described herein, or, in other embodiments, after the enzymatic treatment. For example, in certain embodiments, the waxy maize starch is inhibited using a method as described in International Patent Application Publication no. WO 2013/173161, which is hereby incorporated herein by reference in its entirety. Thus, a method for making an inhibited waxy maize starch for use in the methods described herein can include
 a) heating a non-pregelatinized granular waxy maize starch in an alcoholic medium in the presence of a base at a temperature of at least 35° C.;
 b) neutralizing the base with an acid;
 c) separating the inhibited granular waxy maize starch from the alcoholic medium; and
 d) removing alcohol solvent from the inhibited waxy granular maize starch, e.g., by heating or with steam.

The alcoholic medium generally comprises at least one alcohol, particularly a C1-C4 monoalcohol such as methanol, ethanol, n-propanol, isopropanol, n-butanol, t-butyl alcohol and the like. One or more other substances may also be present in the alcoholic medium, such as a non-alcoholic organic solvent (particularly those that are miscible with the alcohol) and/or water. However, in one embodiment of the method the alcoholic medium does not contain any solvent other than alcohol and, optionally, water. Aqueous alcohols, for example, may be used to advantage. The alcoholic medium may comprise, for instance, 30% to 100% by weight alcohol (e.g., ethanol) and from 0% to 70% by weight water. In one embodiment, the alcoholic medium contains from 80% to 96% by weight alcohol (e.g., ethanol) and from 4% to 20% by weight water, the total amount of alcohol and water equaling 100%. In another embodiment, the alcoholic medium contains 90% to 100% by weight alcohol (e.g., ethanol) and from 0% to 10% by weight water, the total amount of alcohol and water equaling 100%. In other embodiments, not more than 10% or not more than 15% by weight water is present in the alcoholic medium. The quantity of alcoholic medium relative to starch is not considered to be critical, but typically for the sake of convenience and ease of processing sufficient alcoholic medium is present to provide a stirrable and/or pumpable slurry. For example, the weight ratio of starch:alcoholic medium may be from about 1:2 to about 1:6.

In certain methods, at least some amount of treatment agent (base and/or salt) is present when the waxy maize starch feedstock is heated in the alcoholic medium. However, it is advantageous that large amounts of treatment agent (relative to starch) need not be used in order to achieve effective inhibition of the starch, in contrast to previously known starch modification processes. This simplifies the subsequent processing of the inhibited waxy maize starch and lowers potential production costs. Typically, at least 0.5% by weight of treatment agent (based on the dry weight of starch used) is employed, although in other embodiments at least 1%, at least 2%, at least 3%, at least 4% or at least 5% by weight of treatment agent is present. For economic reasons, generally no more than 10% or 15% by weight of treatment agent is present.

Typically, the mixture of starch, alcoholic medium and treatment agent is in the form of a slurry. In certain embodiments, it may be desirable to adjust the pH of the slurry to a particular value. It can be difficult to measure the pH of such a slurry due to the presence of the alcohol. In an embodiment where it is desired t make the slurry basic by adding a base, a suitable amount of base can be determined as if the slurry is a slurry of starch in deionized water alone and then scaled up to the actual amount while keeping the same ratio of base and starch.

The slurry may, for example, be neutral (pH 6 to 8) or basic (pH greater than 8). In one embodiment, the pH of the slurry is at least 6. In another embodiment, the pH of the slurry is at least 7. The slurry pH in another embodiment is not more than 12. In other embodiments, the pH of the slurry is 6-10, 7.5-10.5 or 8-10. In still other embodiments, the pH of the slurry is 5-8 or 6-7.

The alcohol-treatment agent treatment of the starch may be affected by first placing the starch in the alcoholic medium and then adding treatment agent (e.g., base and/or salt). Alternatively, the treatment agent may be first combined with the alcoholic medium and then contacted with the starch. The treatment agent may be formed in situ, such as by separately adding a base and an acid which react to form the salt which functions as the treatment agent.

Suitable bases for use in the process include, but are not limited to, alkali metal and alkaline earth metal hydroxides such as potassium hydroxide, calcium hydroxide and sodium hydroxide.

Suitable salts for use in these methods include water-soluble substances which ionize in aqueous solution to provide a substantially neutral solution (i.e., a solution having a pH of from 6 to 8). Alkali metal-containing salts are particularly useful, as are salts of organic acids (e.g., a sodium or potassium salt) such as itaconic acid, malonic acid, lactic acid, tartaric acid, citric acid, oxalic acid, fumaric acid, aconitic acid, succinic acid, oxalosuccinic acid, glutaric acid, ketoglutaric acid, malic acid, fatty acids and combinations thereof.

Mixtures of different treatment agents may be used. For example, the starch may be heated in the alcoholic medium in the presence of both at least one base and at least one salt.

The starch, alcoholic medium and treatment agent are heated for a time and at a temperature effective to inhibit the starch to the desired extent. Generally speaking, temperatures in excess of room temperature (i.e., 35° C. or greater) will be necessary. At the same time, extremely high temperatures should be avoided. The heating temperature can be, for example, 35° C. to 200° C. Typically, temperatures of from 100° C. to 190° C., 120° C. to 180° C., or from 130° C. to 160° C., or from 140° C. to 150° C. will be sufficient. The heating time generally is at least 5 minutes but no more than 20 hours and typically 40 minutes to 2 hours. In general, a desired level of starch inhibition may be achieved more rapidly if the heating temperature is increased.

The specific conditions of time of treatment, temperature of treatment, and proportions of the components of the mixture of starch, alcoholic medium and treatment agent are generally selected such that the starch is not gelatinized to a significant extent. That is, the starch remains non-pregelatinized as described above.

When the temperature selected for the heating step exceeds the boiling point one or more components of the alcoholic medium, it will be advantageous to carry out the heating step in a vessel or other apparatus capable of being pressurized. The treatment may be conducted within a confined zone in order to maintain the alcoholic medium in a liquid state. Additional positive pressure could be employed, but is generally not necessary. The starch may be slurried in the alcoholic medium together with the treatment agent under conditions of elevated temperature and pressure and treated for a time sufficient to change the starch's viscosity characteristics. Such treatment may be conducted in a stirred tank reactor on a batch basis or in a tubular reactor on a continuous basis, although other suitable processing techniques will be apparent to those skilled in the art. In another embodiment, the starch may be in the form of a bed within a tubular reactor and a mixture of the alcoholic medium and treatment agent passed through such bed (optionally, on a continuous basis), with the bed being maintained at the desired temperature to effect inhibition of the starch.

In embodiments in which a base has been utilized as a treatment agent, the mixture of starch, alcoholic medium and base may be combined with one or more acids, once the heating step is completed, for the purpose of neutralizing the base. Suitable acids for use in such neutralization step include, but are not limited to, carboxylic acids such as itaconic acid, malonic acid, lactic acid, tartaric acid, oxalic acid, fumaric acid, aconitic acid, succinic acid, oxalosuccinic acid, glutaric acid, ketoglutaric acid, malic acid, citric acid, fatty acids and combinations thereof, as well as other types of acids such as uric acid. If the inhibited starch is intended for use as a food ingredient, the acid generally should be selected to be one that is permitted for such use under applicable regulations. Typically, sufficient acid is added to lower the pH of the mixture to about neutral to slightly acidic, e.g., a pH of from about 5 to about 7 or from about 6 to about 6.5.

The neutralization with acid may be earned out at suitable temperature. In one embodiment, the slurry of starch, base and alcoholic medium is cooled from the heating temperature used to approximately room temperature (e.g., about 15° C. to about 30° C.) prior to being combined with the acid to be used for neutralization. The neutralized mixture may thereafter be further processed as described below to separate the inhibited starch from the alcoholic medium. In another embodiment, however, neutralization of the base is followed by further heating of the starch slurry. Such further heating has been found to be capable of modifying the rheological properties of the inhibited starch obtained, as compared to the viscosity characteristics of an analogously prepared starch that has not been subjected to heating after neutralization of the base.

Generally speaking, such further heating step is advantageously carried out at temperatures in excess of room temperature (i.e., 35° C. or greater). At the same time, extremely high temperatures should be avoided. The heating temperature can be, for example, 35° C. to 200° C. Typically, temperatures of from 100° C. to 190° C., 120° C. to 180° C., or from 130° C. to 160° C., or from 140° C. to 150° C. will be sufficient. The heating time generally is at least 5 minutes but no more than 20 hours and typically 40 minutes to 2 hours.

The mixture of starch and alcoholic medium may be processed so as to separate the starch from the alcoholic medium. Conventional methods for recovering particulate solids from liquids such as filtration, decantation, sedimentation or centrifugation may be adapted for such purpose. The separated starch may optionally be washed with additional alcoholic medium and/or alcohol and/or water to remove any undesired, soluble impurities. In one embodiment, neutralization of residual base is accomplished by washing the recovered starch with an acidified liquid medium. Drying of the separated starch will provide an inhibited non-pregelatinized granular starch in accordance with the disclosure. For example, drying may be performed at a moderately elevated temperature (e.g., 30° C. to 60° C.) in a suitable apparatus such as an oven or a fluidized bed reactor or drier or mixer. Vacuum and/or a gas purge (e.g., a nitrogen sweep) may be applied to facilitate removal of volatile substances (e.g., water, alcohol) from the starch. The resulting dried inhibited non-pregelatinized granular starch may be crushed, ground, milled, screened, sieved or subjected to any other such technique to attain a particular desired particle size. In one embodiment, the inhibited starch is in the form of a free-flowing, granular material.

In one embodiment, however, the starch is subjected to a desolventization step at a significantly higher temperature (e.g., greater than 80° C. or greater than 100° C. or greater than 120° C.). Excessively high temperatures should be avoided, however, since degradation or discoloration of the starch may result. Such a step not only reduces the amount of residual solvent (alcohol) in the product but also provides the additional unexpected benefit of enhancing the degree of inhibition exhibited by the starch. Desolventization temperatures can, for example, be about 100° C. to about 200° C. Typical temperatures are 120° C. to 180° C. or 150° C. to 170° C. The desolventization may be carried out in the presence or in the absence of steam. Steam treatment has been found to be advantageous in that it helps to minimize the extent of starch discoloration which may otherwise occur at such an elevated temperature. In one embodiment, steam is passed through a bed or cake of the inhibited waxy maize starch. The starch desolventization methods of U.S. Pat. No. 3,578,498, incorporated herein by reference in its entirety for all purposes, may be adapted for use. Following steam treatment, the inhibited waxy maize starch may be dried to reduce the residual moisture content (e.g., by heating in an oven at a temperature of from about 30° C. to about 70° C. or in a fluidized bed reactor).

In one embodiment, the treated starch, which has been recovered from the alcoholic medium, is first brought to a total volatiles content of not more than about 35% by weight or not more than about 15% by weight. This can be accomplished, for example, by first air or oven drying the recovered starch at moderate temperature (e.g., 20° C. to 70° C.) to the desired initial volatiles content. Live steam is then passed through the dried starch, the system being maintained at a temperature above the condensation point of the steam. A fluid bed apparatus may be used to perform such a steam desolventization step.

In general, it will be desirable to carry out desolventization under conditions effective to result in a residual alcohol content in the inhibited waxy maize starch of less than 1 weight % or less than 0.5 weight % or less than 0.1 weight %.

Following desolventization, the inhibited waxy maize starch may be washed with water and then re-dried to further improve color and/or flavor and/or reduce the moisture content.

Of course, the person, of ordinary skill in the art can use other methodologies to arrive at the starches described herein. The waxy starch feedstock can, for example, be subjected to a pH adjustment and heated. The pH adjustment can be performed by contacting a pH-adjusting agent with the starch; examples of pH-adjusting agents include formic acid, propionic acid, butyric acid, oxalic acid, lactic acid, malic acid, citric acid, fumaric acid, succinic acid, glutaric acid, malonic acid, tartaric acid, itaconic acid, aconitic acid, oxalosuccinic acid, ketoglutaric acid, fatty acids, and carbonic acid, as well as salts thereof (e.g., potassium and/or sodium salts, which can be generated in situ by neutralization of the acid). The pH-adjusting agent can be contacted with the starch feedstock in any convenient fashion, e.g., as a slurry in liquid (e.g., water, alcohol (e.g., as described above, including ethanol or isopropanol), including aqueous alcohol such as aqueous ethanol, or another solvent); in dry form in damp form (e.g., in a mist in a solvent (such as water, aqueous ethanol, or another solvent); or in the form of a damp dough of the starch (e.g., with water, aqueous ethanol, or another solvent). And when an alkali metal salt of an acid is to be used, it can be formed in situ, e.g., by adding the acid and an alkali metal hydroxide or carbonate in separate steps.

The pH adjustment can be performed to yield a variety of pH values. For example, in certain embodiments, and as described in WO 2013/173161, the pH adjustment can be performed to yield a pH in the range of 7-10, in other, alternative embodiments, the pH adjustment can be performed to yield a pH in the range of 3-7, e.g., in the range of 3-6, or 3-5, or 3-4, or 4-7, or 4-6, or 4.5-7, or 4.5-6, or 5-7, or 5-6, or about 3, or about 3.5, or about 4, or about 4.5, or about 5, or about 5.5, or about 6, or about 6.5, or about 7. When the pH adjustment is performed in a slurry, the pH of the slurry is the relevant pH. When the pH adjustment is performed in a substantially non-liquid form (e.g., a dough, or in damp solid), the pH of the solid material at 38% in water is the relevant pH. The amount of the pH-adjusting agent relative to the starch can vary, for example, from 0.05-30 wt % on a dry solids basis, e.g., 0.05-20 wt %, 0.05-10 wt %, 0.05-5 wt %, 0.05-2 wt %, 0.05-1 wt %, 0.05-0.5 wt %, 0.2-30 wt %, 0.2-20 wt %, 0.2-10 wt %, 0.2-5 wt % 0.2-2 wt %, 0.2-1 wt %, 1-30 wt %, 1-20 wt %, 1-10 wt %, 1-5 wt %, 5-30 wt % or 5-20 wt %. Desirably, the pH adjusting agent is mixed thoroughly with the starch feedstock. This will require different process conditions depending on the form in which the pH adjustment is performed, if the pH adjustment is performed in a slurry, simply stirring the slurry for a few minutes may be sufficient. If the pH adjustment is performed in a drier form (e.g., in a damp solid or a dough), more substantial contacting procedures may be desirable. For example, if a solution of the pH-adjusting agent is sprayed onto dry starch feedstock, it can be desirable to mix for about 30 minutes then store for at least a few hours. It is desirable to provide for uniform distribution of the pH-adjusting agent throughout the starch, i.e., on a granular level, in order to provide uniform inhibition.

After the pH-adjusting agent is contacted with the starch, the starch can be heated (i.e. while still in contact with pH-adjusting agent). The starch can be heated in a variety of forms. For example, the starch can be heated in alcohol or non-aqueous solvent slurry (e.g., under pressure, if the boiling point of the solvent not sufficiently above the heating temperature); as a dough of starch, water, and non-water solvent to suppress granular swelling (e.g., as disclosed in WO 2013/173161), or in a dry state (solvent can be removed using conventional techniques such as filtration, centrifugation and/or heat-drying, e.g. as described above with respect WO 2013/173161. The starch can be, for example, dried to a moisture level of less than 5% before further heating. Relatively low temperatures, e.g., 40-80° C., or 40-60° C., or about 50° C., can be used for such drying. Vacuum can also be used in the drying process. The starch can be dried as a result of the heating process (see below); a separate drying step is not necessary.

The dried starch can be heated at a temperature in the range of 100-200° C. For example, in certain methods, the heating temperature is 120-160° C. In other various methods, the heating temperature is 120-180° C., or 120-160° C., or 120-140° C., or 140-200° C., or 140-180° C. or 140-160° C. or 160-200° C., or 160-180° C., or 180-200° C. The starch can be heated for a variety of times. The starch can be heated for a time in the range of, for example, 20 seconds to 20 hours. Typical heating times are in the range of 10 minutes to two hours. Longer heating times and/or higher heat-treatment temperatures can be used to provide more inhibition. The material is desirably uniformly heated. The starch can be heated under pressure to maintain a desired moisture content, or it can be heated in a mass flow bin or similar device.

Certain methods described herein can be practiced, for example, using no alcohol in the liquid medium for the contacting with the pH adjustment. In certain particularly desirable methods, water is used as the medium for the pH adjustment. Accordingly, in certain desirable embodiments, the waxy maize starch comprises less than 500 ppm of alcohol solvent, e.g., less than 500 ppm ethanol. For example, in various embodiments, the waxy maize starch comprises less than 100 ppm, less than 50 ppm, less than 10 ppm, less than 5 ppm, or less than 1 ppm of alcohol solvent, e.g., less than 100 ppm, less than 50 ppm, less than 10 ppm, less than 5 ppm, or less than 1 ppm ethanol.

The heated starch can be allowed to cool then used as-is, or further treated as is conventional in the art. For example, the starch can be washed to provide even whiter color and more pleasant flavor. If a non-aqueous solvent is used, it can be desirable to remove as much solvent as possible. But if relatively low levels of the pH-adjusting agent are used, the final product can meet reasonable pH, and ash targets without further washing.

As the person of ordinary skill in the art will appreciate, the starch feedstock may be purified, e.g., by conventional methods, to reduce undesirable flavors, odors, or colors, e.g., that are native to the starch or are otherwise present. For example, methods such as washing (e.g., alkali washing), steam stripping, ion exchange processes, dialysis, filtration, bleaching such as by chlorites, enzyme modification (e.g., to remove proteins), and/or centrifugation can be used to reduce impurities. The person of ordinary skill in the art will appreciate that such purification operations may be performed at a variety of appropriate points in the process.

While the methods described above can be advantageously used to provide starches for use in the enzymatic processes described herein, other waxy maize starch sources can be used. For example, other inhibition methods can be used, such as through chemical crosslinking, e.g., by phosphate, adipate, epichlorohydrin or acrolein. And starches can be chemically modified, for example by ethereal substitution (e.g., ethyl, hydroxypropyl) or ester substitution (e.g., acetate). Waxy maize starches without inhibition or cross-linking can also used.

The present inventors have determined that use of exo-hydrolyzing enzymes can change the branch chain length distribution of a waxy maize starch in a manner that provides improved textural and stability properties. Accordingly, another aspect of the disclosure is a method for making a waxy maize starch (for example, as otherwise described herein). The method includes providing the waxy maize starch, and treating the waxy maize starch in aqueous media with an exo-hydrolyzing enzyme. As used herein, an exo-hydrolyzing enzyme is an enzyme that catalyzes the hydrolysis of (1,4-alpha)-linked dextrose oligomers from an end thereof to form maltose, with a much higher rate constant than for hydrolysis internal to the (1,4-alpha)-linked dextrose oligomer chain. Examples of exo-hydrolyzing enzymes include glucoamylase, cyclodextrin glucanotransferase, beta amylase, maltotetraose-forming α-amylase (EC 3.2.1.60); maltohexaose-forming α-amylase (EC 3.2.1.98); maltotriose-forming α-amylase (EC 3.2.1.116); maltogenic amylase (EC 3.2.1.133); and maltopentaose-forming α-amylase (EC 3.2.1.~). Certain glucoamylases are also exo-hydrolyzing enzymes. Other alpha amylases are generally not exo-hydrolyzing enzymes. The person of ordinary skill in the art can distinguish between exo-hydrolyzing enzymes and endo-hydrolyzing enzymes (i.e., those that more randomly hydrolyze dextrose oligomers) using the method described in G. S. Drummond et al., "A General Method for Distinguishing Between Endo and Exo Actions of Carbohydrases," FEBS Letts., 15(4), 302-304 (1971), which is hereby incorporated herein by reference in its entirety.

Based on the present disclosure and the examples provided below, the person of ordinary skill in the art will select reaction conditions for the enzymatic treatment to provide a desired product. For example, in certain embodiments as otherwise described herein, the enzyme treatment is performed in aqueous media at a temperature in the range of 30-70° C., In certain embodiments as otherwise described herein, the enzyme treatment is performed in aqueous media at an enzyme concentration in the range of 0.001-3%. In certain embodiments as otherwise described herein, the enzyme treatment is performed for a time in the range of 10-600 minutes. Depending on the enzyme, the enzyme treatment can be performed at a variety of pH values in the range of 3.0-9.5.

The waxy maize starch can, in some embodiments, be cooked in aqueous media before the enzyme treatment. For example, in certain embodiments, the starch is heated in aqueous media for a temperature in the range of 90-100° C. for 10-60 minutes before the enzyme treatment. But other cooking methods can be used, and in other embodiments the enzyme treatment can be performed on substantially uncooked starch.

After the enzyme treatment, the waxy maize starch can be washed with aqueous media to remove the enzyme and a substantial amount of the maltose and other soluble low-molecular weight material. For example, the waxy maize starch can be washed with sufficient aqueous media to provide the waxy maize starch with less than 1 wt %, less than 0.5 wt %, or even less than 0.1% maltose on a dry solids basis. The starch can be dried using conventional methods.

The waxy maize starch can, in some embodiments, be heat treated after the enzyme treatment to denature the enzyme to control the hydrolysis to a desired degree. Such heat treatment can be, for example, at 90-100° C. for a time of at least 10 minutes. Other quenching methods can be used, especially when it is not desired to cook the starch. For example, ethanol can be added to the reaction mixture, or the pH can be adjusted to quench the enzymatic reaction to control the branch chain length distribution.

Using reaction conditions such as enzyme concentration, temperature, time and pH, the person of ordinary skill in the art can control the reaction, based on the information provided herein, to result in a desired degree of hydrolysis and thus a desired degree of conversion of branch chains of the amylopectin fraction of the waxy maize starch. For example, in certain embodiments as otherwise described herein, the treatment with the exo-hydrolyzing enzyme is performed to increase the DP3-12 value of the waxy maize starch by at least 1.0 percentage point; and reduce the DP13-24 value of the waxy maize starch by at least 1.0 percentage point. In certain such embodiments, the treatment reduces the DP25-36 value of the waxy maize starch by at least 0.5 percentage points. In certain embodiments as otherwise described herein, the treatment with the exo-hydrolyzing enzyme is performed to increase the DP3-12 value of the waxy maize starch by at least 2.0 percentage points; and reduce the DP13-24 value of the waxy maize starch by at least 2.0 percentage points (and in some such embodiments, to reduce the DP25-36 value of the waxy maize starch by at least 1.0 percentage point). In certain embodiments as otherwise described herein, the treatment with the exo-hydrolyzing enzyme is performed to increase the DP3-12 value of the waxy maize starch by at least 3.0 percentage points; and reduce the DP13-24 value of the waxy maize starch by at least 3.0 percentage points (and in some such embodiments, to reduce the DP25-36 value of the waxy maize starch by at least 2.0 percentage points). In certain embodiments as otherwise described herein, the treatment with the exo-hydrolyzing enzyme is performed to increase the DP3-12 value of the waxy maize starch by at least 5.0 percentage points; and reduce the DP13-24 value of the waxy maize starch by at least 5.0 percentage points (and in some such embodiments, to reduce the DP25-36 value of the waxy maize starch by at least 3.0 percentage points).

The person of ordinary skill in the art will use conventional starch processing techniques, including those described above with respect to inhibition, to provide the waxy maize starch in the desired form.

Another aspect of the disclosure is a waxy maize starch made by a process as described herein. For example, the waxy maize starches described above can be made by the processes as described herein.

In certain desirable embodiments as otherwise described herein, the waxy maize starches of the disclosure are porous. Porosity can be determined by microscopy of the starch particles. Without intending to be bound by theory, the present inventors surmise that the use of exo-hydrolyzing enzymes allows for the maintenance of the overall particle physical structure because the overall chain lengths of the starch molecules are not substantially changed. The removal of material resulting from shortening of branch chains via exo-hydrolysis causes void space in the particle, which forms local porosity. The porosity can be evident, for example, as a surface pitting, pinholing or cratering. However, in other embodiments, substantially no porosity is evident.

The waxy maize starches of the disclosure can be provided in a form suitable for use as an ingredient for a foodstuff. For example, in certain embodiments, a waxy maize starch as otherwise described herein is provided in a composition comprising the waxy maize starch in a concentration of at least 50 wt % on a dry solids basis. For example, in certain embodiments, the waxy maize starch is provided in a composition comprising the waxy maize starch in a concentration of at least 75 wt % on a dry solids basis, at least 90 on a dry solids basis, or even at least 98 wt % on a dry solids basis). Compositions can be provided as solids (e.g., consisting essentially of a waxy maize starch as described herein), or in other embodiments as liquids (e.g., in water, at a solids level of 5-50%).

Another aspect of the disclosure is a pregelatinized starch made by a method comprising gelatinizing and drying a waxy maize starch as described herein (i.e., in the substantial absence of other food ingredients, in order to provide a material that is at least 95 wt % or even at least 99 wt % on a dry solids basis pregelatinized starch). The person of ordinary skill in the art will use conventional pregelatinization methods.

The starches described herein can be used as thickeners or viscosifiers, e.g., to increase the viscosity of a fluid or semisolid composition. One problem with conventional starches is that upon storage, e.g., long periods of storage, upon storage at cool temperatures, or upon undergoing freeze/thaw cycles, the starch can become dehydrated as a result of intermolecular association and irreversibly lose water through a process known as syneresis. This can markedly deteriorate the texture and clarity of the food product. Advantageously, when a food product containing a starch of the present disclosure is cooked and cooled to the desired storage temperature, it can maintain its textural attributes for a long time throughout its shelf life and withstand the temperature fluctuations (e.g. freeze-thaw cycle) during storage. Thus, the food products that include a starch as described herein can be substantially freeze-thaw stable, substantially stable to refrigeration, and/or substantially stable to storage. In certain embodiments as otherwise described herein, the waxy maize starch has one or more of 1) a graininess of 4 or less after two freeze-thaw cycles, 2) a syneresis of 5 or less, 3 or less, or even 2 or less after two freeze-thaw cycles, 3) a change in firmness of no more than 2 after two freeze-thaw cycles, and 4) a change in clarity of no more than 4 after two freeze-thaw cycles. All such properties are measured as described in the Examples below.

Accordingly, another aspect of the disclosure is a method for making a food product. The method includes cooking a starch as described herein the presence of water; and providing the cooked starch in combination with one or more other food ingredients. For example, a starch as described herein can be combined with one or more other food ingredients that include water, and cooking the combination of the starch and the food ingredients. In particular embodiments, the method includes pasteurization, retorting, kettle or batch cooking, or ultra-high temperature processing. The starch can alternatively be cooked separately, and later combined with one or more of the food ingredients.

The food product can be, for example, a tomato-based product, a gravy, a sauce such as a white sauce or a cheese sauce, a soup, a pudding, a salad dressing (e.g., pourable or spoonable), a yogurt, a sour cream, a pudding, a custard, a cheese product, a fruit filling or topping, a cream filling or topping, a syrup (e.g., a lite syrup), a beverage (e.g., a dairy-based beverage), a glaze, a condiment, a confectionary, a pasta, a frozen food, a cereal, or a soup. A variety of cooking methods can be used, for example, pasteurization, retorting, kettle cooking, batch cooking and ultra-high temperature processing.

The starches described herein can also be used to modify the properties of solid foods, e.g., baked goods, for example, acting as an anti-stalant to provide a softer product that retains a fresher texture after storage. Accordingly, in other embodiments, the food product is a baked good, e.g., a bread, a pastry, a pie crust, a donut, a cake, a biscuit, a cookie, a cracker, or a muffin. In such embodiments, the cooking can include baking. In some embodiments, the use of the starches described herein in a baked good (i.e., in the dough or batter thereof) can help reduce staling. In other embodiments, the starch can be included in, e.g., a filling inside the baked good.

A variety of other food products can advantageously be made using the starches of the present disclosure. For example, food products in which the starches of the present disclosure are useful include thermally-processed foods, acid foods dry mixes, refrigerated foods, frozen foods, extruded foods, oven-prepared foods, stove top-cooked foods, microwaveable foods, full-fat or fat-reduced foods, and foods having a low water activity. Food products in which the starches of the present disclosure are particularly useful are foods requiring a thermal processing step such as pasteurization, retorting, high-temperature short-time treatment, or ultra high temperature (UHT) processing. The starches of the present disclosure are particularly useful in food applications where stability is required through all processing temperatures including cooling, freezing and heating.

Based on processed food formulations, the practitioner may readily select the amount and type of the starches of the present disclosure required to provide the necessary thickness and gelling viscosity in the finished food product, as well as the desired texture. Typically, the starch is used in an amount of 0.1-35%, e.g., 0.5-6.0%, by weight, of the food product.

Among the food products which may be improved by the use of the starches of the present disclosure are high acid foods (pH <3.7) such as fruit-based pie fillings, baby foods, and the like; acid foods (pH 3.7-4.5) such as tomato-based products; low acid foods (pH >4.5) such as gravies, sauces, and soups; stove top-cooked foods such as sauces, gravies, and puddings; instant foods such as puddings; pourable and spoonable salad dressings; refrigerated foods such as dairy or imitation dairy products (e.g., yogurt, sour cream, and cheese); frozen foods such as frozen desserts and dinners; microwaveable foods such as frozen dinners; liquid products such as diet products and hospital foods; dry mixes for preparing baked goods, gravies, sauces, puddings, baby foods, hot cereals, and the like; and dry mixes for predusting foods prior to batter cooking and frying.

In other embodiments, the food product is a confection.

The starches described herein can be used in a wide variety of other foods. For example, in certain embodiments of the starches and methods of the disclosure, the starch is used in a food selected from baked foods, breakfast cereal, anhydrous coatings (e.g., ice cream compound coating, chocolate), dairy products, confections, jams and jellies, beverages, fillings, extruded and sheeted snacks, gelatin desserts, snack bars, cheese and cheese sauces, edible and water-soluble films, soups, syrups, sauces, dressings, creamers, icings, frostings, glazes, tortillas, meat and fish, dried fruit, infant and toddler food, and batters and breadings. The starches described herein can also be used in various medical foods. The starches described herein can also be used in pet foods.

The starches of the present disclosure may also be used in various non-food end use applications where starches have conventionally been utilized, such as cosmetic and personal care products, paper, packaging, pharmaceutical formulations, adhesives, and the like.

Desirably, the starches of the disclosure can provide superior properties, such as freeze-thaw stability, in combination with good digestive tolerance. The present inventors have determined that the starches described herein, unlike many highly modified starches, can be provide desirable properties, such as desirable viscosity properties and desirable freeze-thaw tolerance, even in demanding storage conditions, without becoming indigestible or without otherwise causing digestive intolerance.

For example, in certain desirable embodiments as otherwise described herein, the starches of the disclosure have one or more of (e.g., two or more of, or all three of):
a) a desirable viscosity, e.g., a viscosity as measured by RVA in the range of 50-1500 cP. In certain such embodiments, the viscosity as measured by RVA is in the range of 50-1000 cP, 50-850 cP, 50-700 cP, 50-500 cP, 50-400 cP, 50-300 cP, 50-200 cP, 100-1100 cP, 100-1000 cP, 100-850 cP, 100-700 cP, 100-500 cP, 100-400 cP, 100-300 cP, 200-1100 cP, 200-1000 cP, 200-850 cP, 200-700 cP, 200-500 cP, 400-1100 cP, 400-1000 cP, 400-850 cP, 400-700 cP, 600-1100 cP, or 600-850 cP, 700-1500 cP, or 700-1300 cP;
b) desirable freeze-thaw behavior, e.g., one or more of 1) a graininess of 4 or less after two freeze-thaw cycles, 2) a syneresis of 5 or less, 3 or less, or even 3 or less after two freeze-thaw cycles, and 3) a change in firmness of no more than 2 units after two freeze-thaw cycles; and
c) good digestive tolerance.

Another aspect of the disclosure is a dry mix comprising a starch as described herein, in admixture with one or more food ingredients. When the dry mix is cooked (i.e. in the presence of water), it can take a longer time to gel, and thus allow for longer times to hold cooked product, to convey cooked product (e.g., by pumping), and to fill cooked product into containers before the product sets to gel. The dry mix can be, for example, a dry mix for a baked good, e.g., a bread, a pastry, a pie crust, a donut, a cake, a biscuit, a cookie, a cracker, or a muffin.

Further description is provided with respect to the Examples, below.

Example 1—Treating Cooked Inhibited Starch with Beta Amylase

Four samples of an inhibited waxy maize starch (26.84 g each, moisture content ~10.6%, sedimentation volume 25-27 mL/g) were prepared in deionized water at 8% solids in metal beakers. The gross masses of the beakers were recorded. The beakers were cooked at 95° C. using a water bath, for six minutes with hand stirring and 20 minutes without stirring. The cooked pastes were cooled to room temperature, then allowed to equilibrate in a 45° C. water bath for an hour. Three stocks of beta amylase (Secure®, obtained in liquid form from Novozymes, 5000 BAMU/g) were prepared. Stock 1-1 was 0.12 g of enzyme as supplied, diluted to 50 g in deionized water. Stock 1-2 was 10 g of Stock 1-1 diluted to 50 g in deionized water. And Stock 1-3 was 10 g of Stock 1-2 diluted to 50 g in deionized water. 10 g of each of Stocks 1-1-1-3 were added to a beaker to provide Samples 1-1-3; Sample 1-4 was the fourth beaker, treated as a control. Samples 1-1-1-4 were allowed to react at 45° C. for one hour, then quenched by heating in the 95° C. water bath for 20 minutes. The samples were allowed to cool, then water was added to return the samples to 8% solids.

For each sample, 50 g of the starch paste was diluted to 80 g in a 4 oz glass jar to provide pastes at 5% solids. Two jars were prepared for each Sample. One set of jars was maintained at room temperature for Freeze-Thaw Cycle 0 sensory analysis. The other set of jars was maintained at −20° C. for at least 14 hours, then allowed to come to room temperature to provide Freeze-Thaw Cycle 1 samples. Sensory attributes of the Cycle 1 samples were evaluated 6-8 hours after removal from the freezer.

Samples were evaluated by panelists who evaluated Clarity, Firmness, Syneresis and Graininess as described below. Each attribute was rated on a 15 point line scale. References with different ratings were provided to each group. Values provided are averages of 3-4 people.

Firmness was determined by comparison with commercially available products:
Firmness 3—Suave Creamy almond & verbena Body Wash
Firmness 7—Shea Moisture Coconum & Hibiscus Curling Gel Souffle w/Agave Nectar & Flax Seed Oil
Firmness 11—Garnier Power Putty Surfer Hair
To determine firmness, the back of a spoon was used to prod the test starches and reference products 2-3 times; the fame against the spoon was estimated for the test starches with respect to the reference products. Higher numbers indicate higher firmness.

Clarity was determined by comparison with the pictures of FIG. 1. Test starches were scooped onto, a shallow transparent, plastic plate and evened out with a scraper to be flush with the side and edges of the dish, a thickness of 5 mm. The plate was placed on a piece of white paper printed with the number and a clarity score was determined based on comparison with the pictures of FIG. 1. Higher numbers indicate higher clarity.

Figure 2:
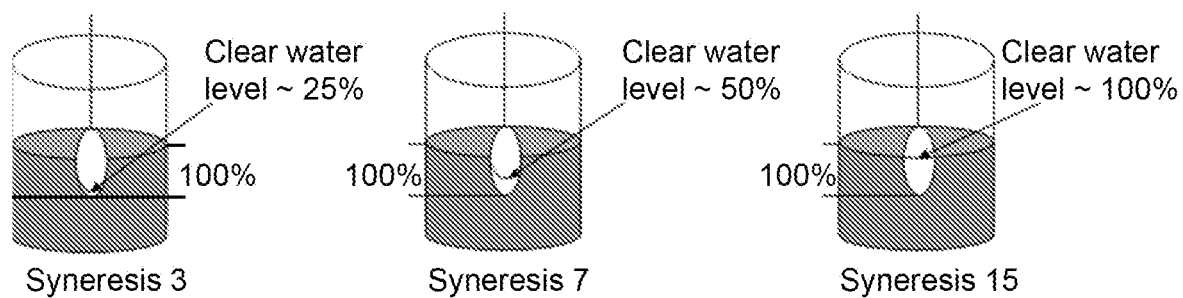
FIG. 2 is a diagram demonstrating the syneresis experiments performed in the examples.

Syneresis was determined by holding a plastic spoon at a 45 degree angle against the test sample surface, gently pressing the test sample about halfway down, and observing from the side how much clear water was squeezed out in 3 seconds. The level of syneresis was determined by comparison with the pictures of FIG. 2.

Figure 3:
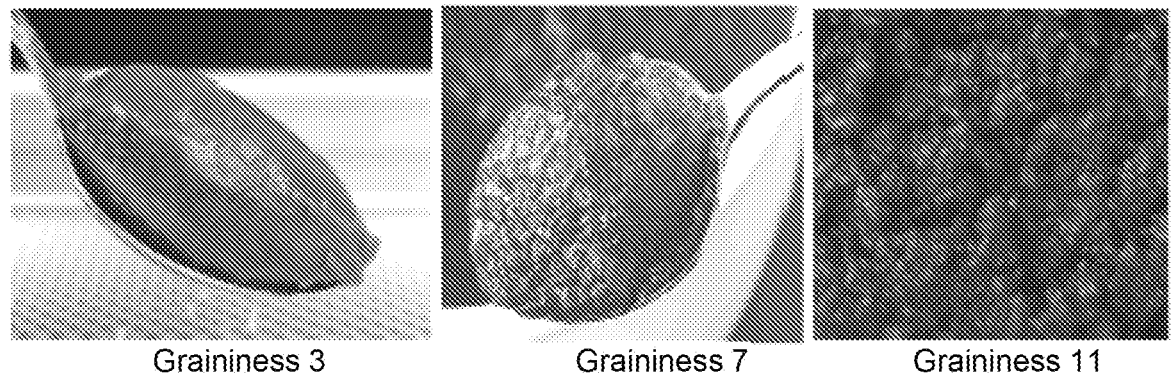
FIG. 3 is a set of photographs of standards for graininess used in the experiments described in the examples.

Graininess (i.e., surface graininess) was determined by observing the top surface of the test starch and comparing it with the pictures of FIG. 3.

Data for the sensory evaluation of Samples 1-4 at Cycles 0 and 1 are provided in the table below (in which, resulting from enzyme concentrations, Sample 1-1 had the most enzyme treatment, Sample 1-2 an intermediate amount, Sample 1-3 the least, and Sample 1-4 none at all (and thus serves as control)):

| Sample | 1-1 | 1-2 | 1-3 | 1-4 |
|---|---|---|---|---|
| Clarity - Cycle 0 | 12.1 | 7.2 | 4.9 | 5.5 |
| Clarity - Cycle 1 | 12.0 | 5.0 | 1.3 | 0.6 |
| Firmness - Cycle 0 | 0.8 | 1.2 | 1.5 | 1.1 |
| Firmness - Cycle 1 | 1.9 | 2.1 | 2.3 | 2.3 |
| Graininess - Cycle 0 | 0.4 | 0.4 | 1.4 | 0.4 |
| Graininess - Cycle 1 | 3.2 | 4.6 | 4.8 | 2.6 |
| Syneresis - Cycle 0 | 0.0 | 0.0 | 0.0 | 0.1 |
| Syneresis - Cycle 1 | 0.1 | 0.0 | 2.0 | 2.3 |

Clarity was improved in all enzyme-treated samples as compared to control, with more improvement with more enzyme treatment. Syneresis was significantly improved in the two higher-treatment samples 1 and 2.

Branch chain lengths were measured using the analytical technique described above. To provide samples, 13 g of starch paste from each of samples 1-1, 1-2, 1-3 and 1-4 was diluted in Milli-Q water to 40 g in a 50 mL centrifuge tube. After mixing thoroughly on a Vortex mixer, the tubes were centrifuged at 6000 rpm for 10 min; The supernatant was decanted and fresh Milli-Q water was added back to 40 g. Washing was repeated 3 times. The washed paste was dried in an alumina pan at 50° C. before submitting for the branch-chain length distribution assay.

Data are provided below, with standard deviations of two independent debranching/measurement analyses provided in parentheses:

|  | Sample 1-1 | Sample 1-2 | Sample 1-3 | Sample 1-4 |
|---|---|---|---|---|
| DP3-5 (%) | 17.83 (0.93) | 5.60 (0.08) | 1.62 (0.00) | 0.45 (0.02) |
| DP6-12 (%) | 31.57 (0.45) | 26.95 (0.31) | 24.89 (0.16) | 23.14 (0.34) |
| DP13-24 (%) | 34.40 (0.43) | 47.18 (0.02) | 52.24 (0.09) | 53.89 (0.23) |
| DP25-36 (%) | 12.06 (0.09) | 14.78 (0.18) | 15.84 (0.11) | 16.73 (0.31) |
| DP37+ (%) | 5.14 (0.06) | 6.16 (0.07) | 5.41 (0.14) | 5.76 (0.25) |

A significant shift of the branch chain length distribution resulted from the beta amylase treatment, with larger shifts to shorter-chain branches correlating with more treatment. These data correlate with the sensory data, suggesting that the shift of the branch chain length distribution is responsible for the improved sensory properties.

Example 2—Treating Cooked Inhibited Starch with Maltogenic Alpha Amylase

The experiment of Example 1 was repeated (28.84 g each sample) using a maltogenic alpha amylase (Maltogenase® L, Novozymes, 3200 MANU/g), with a reaction time of 30 minutes. Three jars for each Sample were prepared. Four enzyme stocks were made: Stock 2-0 was 0.2 g of enzyme as supplied diluted to 20 g in deionized water. Stock 2-1 was 5 g of Stock 2-0 diluted to 20 g in deionized water. Stock 2-2 was 2.5 g of Stock 2-1 diluted to 10 g in deionized water.

Stock 2-2 was 1 g of Stock 2-1 diluted to 10 g in deionized water. 10 g of each of Stocks 2-1-2-3 were added to each of three sample beakers to provide Samples 2-1-2-3; Sample 2-4 was not treated with enzyme and thus serves as control. For each Sample, two jars underwent Freeze-Thaw Cycle 1; one of each underwent a second Freeze-Thaw Cycle 2. Sensory, sedimentation volume and branch chain length distribution data are provided in the tables below:

| Sample | 2-1 | 2-2 | 2-3 | 2-4 |
| --- | --- | --- | --- | --- |
| Clarity - Cycle 0 | 12.5 | 7.5 | 6.3 | 4.2 |
| Clarity - Cycle 1 | 11.1 | 5.4 | 1.8 | 0.4 |
| Clarity - Cycle 2 | 11.2 | 3.8 | 1.2 | 0.0 |
| Firmness - Cycle 0 | 0.6 | 1.2 | 1.2 | 2.0 |
| Firmness - Cycle 1 | 0.8 | 1.6 | 2.1 | 2.5 |
| Firmness - Cycle 2 | 1.4 | 2.7 | 4.1 | 5.6 |
| Graininess - Cycle 0 | 0.3 | 0.8 | 1.0 | 1.0 |
| Graininess - Cycle 1 | 1.8 | 3.0 | 5.7 | 5.7 |
| Graininess - Cycle 2 | 1.8 | 4.7 | 6.1 | 8.3 |
| Syneresis - Cycle 0 | 0.0 | 0.0 | 0.0 | 0 |
| Syneresis - Cycle 1 | 0.2 | 0.2 | 0.8 | 5.7 |
| Syneresis - Cycle 2 | 0.0 | 0.3 | 3.9 | 11.1 |
| Sedimentation volume | 22 mL/g | 25.5 mL/g | 31 mL/g | 27 mL/g |

Samples submitted for the branch-chain length distribution assay were prepared following the same procedure as in Example 1. In this case, the gradient was 40% of B at 0 min, 50% of B at 2 min, 60% of B at 10 min, and 80% of B at 40 min, and the flow rate was set at 1 mL/min.

| | Sample 2-1 | Sample 2-2 | Sample 2-3 | Sample 2-4 |
| --- | --- | --- | --- | --- |
| DP3-5 (%) | 24.41 | 8.1 | 3.71 | 0.45 |
| DP6-12 (%) | 20.6 | 29.17 | 26.76 | 23.14 |
| DP13-24 (%) | 35.69 | 43.33 | 48.48 | 53.89 |
| DP25-36 (%) | 14.11 | 13.94 | 15.36 | 16.73 |
| DP37+ (%) | 5.19 | 5.46 | 5.68 | 5.76 |

Clarity, firmness, graininess and syneresis all improved with enzyme treatment, with the degree of improvement correlating with the increase in the relative amount of shorter chains.

In contrast, treatment with Branchyzyme® branching enzyme under analogous conditions drastically reduced the molecular weight of the starch, but did not significantly modify the branch chain length distribution.

Example 3—Treating Starch with Beta Amylase

Using the same starch as in Examples 1 and 2, five slurries of 110 g starch mixed with 150 g deionized water were prepared. Secure® beta amylase as used as received. Sample 3-1 received 0.5 mm of enzyme, Sample 3-2 received 0.25 mL of enzyme, and Sample 3-3 received 0.1 mL of enzyme. The samples were reacted at 50° C. for two hours. For each sample, about 5 g slurry was removed and mixed with 95° C. water to about 100 g total mass; the resulting mixtures were cooked at 95° C. for 20 minutes, diluted to 200 g, then allowed to settle at room temperature overnight.

For the remainder of each sample, 100 g ethanol was added, the mixture was held at 4 overnight, and the slurry was filtered through a Buchner funnel to provide a starch cake which was crumbled then allowed to dry overnight. The solid was further dried overnight in a 50° C. oven, then ground in a coffee grinder.

Dried starches of Samples 3-1, 3-2 and 3-3 were cooked in deionized water at 5.3% solids, with the original starch feedstock as a control and a conventional cornstarch being cooked at 5% solids as controls. The enzyme-treated starches were cooked at slightly higher solids contents to provide materials with similar initial viscosities. The samples, together with the untreated feed starch, underwent Freeze-Thaw testing through Cycles 0, 1 and 2 as described in Examples 1 and 2. The results of the sensory testing are provided in the tables below:

| Attribute: Surface-graininess | | | | |
| --- | --- | --- | --- | --- |
| FT cycle | Feed | 3-1 | 3-2 | 3-3 |
| FT0 | 0.6 | 0.5 | 0.3 | 0.3 |
| FT1 | 7.4 | 5.1 | 7.0 | 6.8 |
| FT2 | 8.6 | 6.7 | 7.6 | 9.3 |

| Attribute: Clarity | | | | |
| --- | --- | --- | --- | --- |
| FT cycle | Feed | 3-1 | 3-2 | 3-3 |
| FT0 | 5.6 | 14.7 | 10.4 | 7.1 |
| FT1 | 0.3 | 9.2 | 1.7 | 2.6 |
| FT2 | 0.3 | 1.4 | 0.6 | 0.3 |

| Attribute: syneresis | | | | |
| --- | --- | --- | --- | --- |
| FT cycle | Feed | 3-1 | 3-2 | 3-3 |
| FT0 | 0.0 | 0.0 | 0.0 | 0.0 |
| FT1 | 2.1 | 0.4 | 1.1 | 1.4 |
| FT2 | 9.1 | 3.0 | 6.9 | 9.4 |

| Attribute: firmness | | | | |
| --- | --- | --- | --- | --- |
| FT cycle | Feed | 3-1 | 3-2 | 3-3 |
| FT0 | 2.5 | 0.9 | 2.4 | 2.4 |
| FT1 | 3.7 | 1.6 | 2.8 | 3.1 |
| FT2 | 7.3 | 5.5 | 7.6 | 8.1 |

Dried starch samples 3-1, 3-2 and 3.3 were cooked in RVA buffy with 1% NaCl at 5% solids, 20 g of cooked paste was diluted to 100 g the same buffer in a graduated cylinder, and allowed to settle for 24 h. After removal of the supernatant with a pipette, the paste was diluted again in the same buffer to 100 g, and allowed settle overnight. After removal of the supernatant, the settled paste was dried at 50° C. overnight and the dried paste was analyzed by the Branch-Chain length distribution assay technique described herein. Branch chain length distribution data are provided below:

| | Sample 3-1 | Sample 3-2 | Control |
| --- | --- | --- | --- |
| DP3-5 (%) | 2.09 (0.00) | 1.40 (0.00) | 0.41 (0.02) |
| DP6-12 (%) | 26.99 (0.32) | 24.83 (0.31) | 22.03 (0.19) |
| DP13-24 (%) | 51.03 (0.00) | 52.41 (0.02) | 53.41 (0.10) |
| DP25-36 (%) | 14.93 (0.21) | 15.94 (0.20) | 17.82 (0.25) |
| DP37+ (%) | 4.96 (0.10) | 5.42 (0.13) | 6.33 (0.02) |

Figure 4:
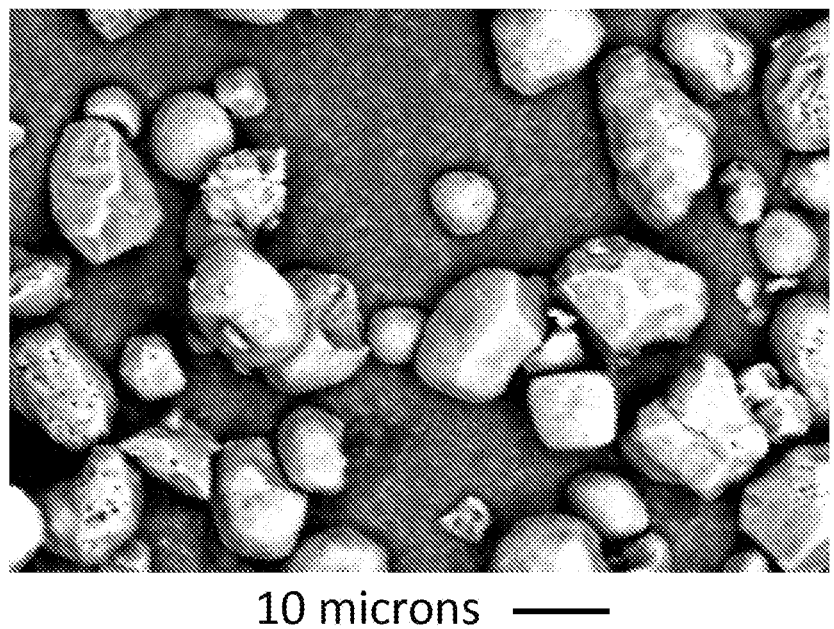
FIG. 4 is a micrograph of the dried product of Sample 3-2.
Figure 5:
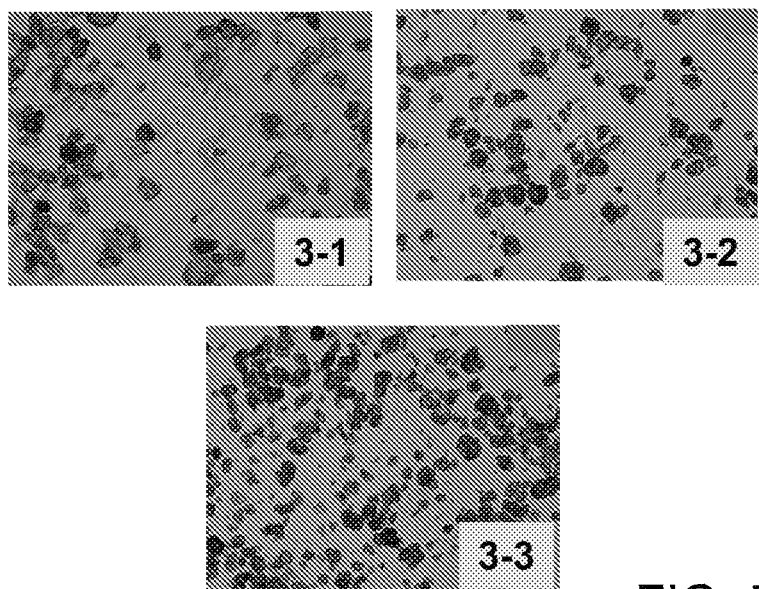
FIG. 5 preset a setoff graphs of Samples 3-1, 3-2 and 3-3 after cooking in 95° C. water FIG. 6 provides a set of micrographs of Samples 4-1, 4-2, 4-3 and 4-4 after cooking in 95° C. water.

FIG. 4 is a micrograph of the dried product of Sample 3-2. Surface pores and pitting are visible on the starch particles. FIG. 5 presents a set of micrographs of Samples 3-1, 3-2 and 3-3 after cooking in 95° C. water as described above. Notably, the starch granules remain intact after enzyme treatment.

Example 4—Treating Starch with Maltogenic Alpha Amylase

Using the same starch as in Examples 1 and 2, four slurries of 165 g starch mixed with deionized water to a total weight of 400 g were prepared. The starches were equilibrated at 50° C. with overhead stirring. A stock solution of 0.64 g Maltogenase® L diluted in deionized water to 50 g was prepared. Enzyme was added to each sample (Sample 4-1, 3 mL; Sample 4-2, 6 mL; Sample 4-3, 9 mL. Sample 4-4, 15 mL) and the samples were stirred at 50° C. for two hours. For each sample, about 5 g slurry was removed and mixed with 95° C. water to about 100 g total mass, the resulting mixtures were cooked at 95° C. for 20 minutes. diluted to 200 g, then allowed to settle at room temperature overnight. Supernatant was withdrawn and submitted for solubles analysis. The settled paste was dried at 50° C. overnight and the branch-chain length distribution of these samples was measured using the technique described herein.

For the remainder of each sample, 140 g ethanol was added, and the mixture allowed to sit at room temperature for 30 minutes with occasional hand stirring. Each sample was divided into two roughly equal portions and each portion filtered through a Buchner funnel. One portion of each sample was washed further with 200 g of water, while the other portion of each sample was not. Washed samples were dried at 50° C. overnight. Unwashed samples were dried in a fume hood at room temperature overnight, then at 50° C. for four hours.

Freeze-thaw studies were performed as described above in Example 3, with the same cooking conditions used. The data are below:

| Sample | 4-1 unwashed | 4-2 unwashed | 4-3 unwashed | 4-4 unwashed | Control starch |
|---|---|---|---|---|---|
| Clarity - Cycle 0 | 6.2 | 7.5 | 8.8 | 10.1 | 2.8 |
| Clarity - Cycle 1 | 2.3 | 4.0 | 7.6 | 9.2 | 0.6 |
| Clarity - Cycle 2 | 0.4 | 3.3 | 6.3 | 8.8 | 0.1 |
| Firmness - Cycle 0 | 1.9 | 1.7 | 1.4 | 1.0 | 1.9 |
| Firmness - Cycle 1 | 2.3 | 1.7 | 2.0 | 1.3 | 2.3 |
| Firmness - Cycle 2 | 4.1 | 2.3 | 2.5 | 1.5 | 7.2 |
| Graininess - Cycle 0 | 0.5 | 0.5 | 0.4 | 0.5 | 0.6 |
| Graininess - Cycle 1 | 7.3 | 5.9 | 3.9 | 2.9 | 6.5 |
| Graininess - Cycle 2 | 8.3 | 6.8 | 5.3 | 3.7 | 7.0 |
| Syneresis - Cycle 0 | 0.0 | 0.0 | 0.0 | 0.0 | 0.0 |
| Syneresis - Cycle 1 | 0.1 | 0.1 | 0.0 | 0.0 | 2.7 |
| Syneresis - Cycle 2 | 5.5 | 1.1 | 0.1 | 0.2 | 10.0 |

| Sample | 4-1 washed | 4-2 washed | 4-3 washed | 4-4 washed | Control starch |
|---|---|---|---|---|---|
| Clarity - Cycle 0 | 6.9 | 8.9 | 9.9 | 10.6 | 3.1 |
| Clarity - Cycle 1 | 2.4 | 6.7 | 10.5 | 10.8 | 0.4 |
| Clarity - Cycle 2 | 1.4 | 4.0 | 7.7 | 9.6 | 0.4 |
| Firmness - Cycle 0 | 2.9 | 1.8 | 2.1 | 1.6 | 1.6 |
| Firmness - Cycle 1 | 4.3 | 3.1 | 2.1 | 1.8 | 1.8 |
| Firmness - Cycle 2 | 4.4 | 4.2 | 2.7 | 2.1 | 2.1 |
| Graininess - Cycle 0 | 0.5 | 0.5 | 0.5 | 0.3 | 0.4 |
| Graininess - Cycle 1 | 6.4 | 6.6 | 3.8 | 3.4 | 7.5 |
| Graininess - Cycle 2 | 6.3 | 5.0 | 4.3 | 5.2 | 9.7 |
| Syneresis - Cycle 0 | 0.0 | 0.0 | 0.0 | 0.0 | 0.0 |
| Syneresis - Cycle 1 | 0.3 | 0.0 | 0.0 | 0.0 | 2.3 |
| Syneresis - Cycle 2 | 0.3 | 0.1 | 0.1 | 0.0 | 8.6 |

RVA, sedimentation volume and solubles data for the washed samples are provided:

| Sample | 4-1 | 4-2 | 4-3 | 4-4 |
|---|---|---|---|---|
| RVA viscosity (cP) | 452 | 438 | 418 | 417 |
| SV (mL/g) | 24 | 24 | 25 | 26 |
| Solubles (%) | 9.58 | 11.09 | 13.71 | 14.31 |

Branch chain length data for the washed samples and for the control starch are provided below:

| Sample | 4-1 | 4-2 | 4-3 | 4-4 | Control starch |
|---|---|---|---|---|---|
| DP3-5 (%) | 11.7 | 15.63 | 27.03 | 29.10 | 0.36 |
| DP6-12 (%) | 28.54 | 30.32 | 32.22 | 32.95 | 21.97 |
| DP13-24 (%) | 40.94 | 36.7 | 28.23 | 26.73 | 53.2 |
| DP25-36 (%) | 13.43 | 11.99 | 9.12 | 8.47 | 17.85 |
| DP37+ (%) | 5.73 | 5.25 | 3.4 | 2.74 | 6.62 |

Figure 6:
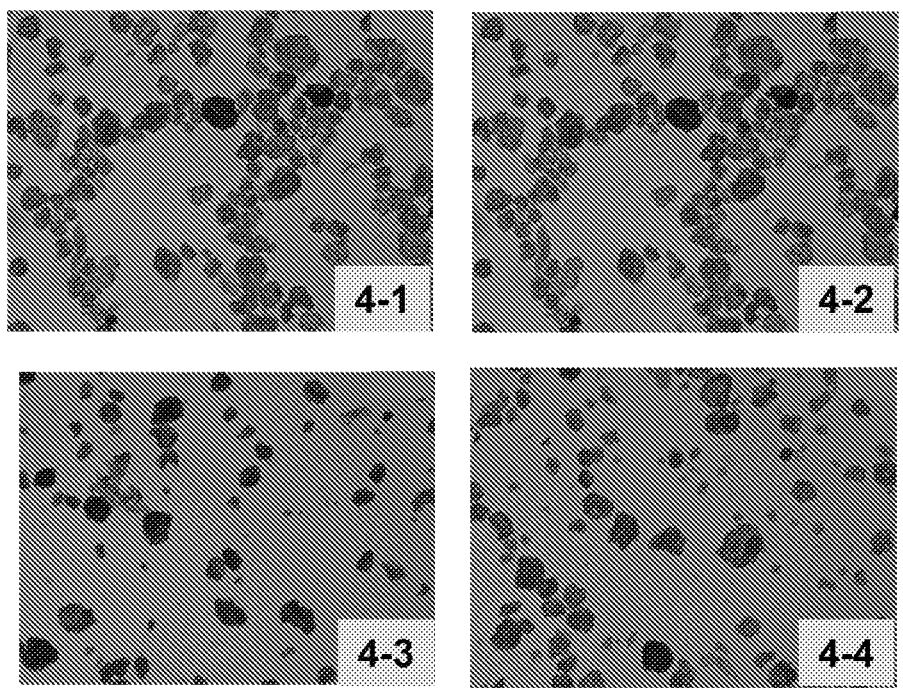

FIG. 6 provides a set of micrographs of Samples 4-1, 4-2, 4-3 and 4-4 after cooking in 95° C. water as described above. Notably, the starch granules remain intact after enzyme treatment.

Figure 7:
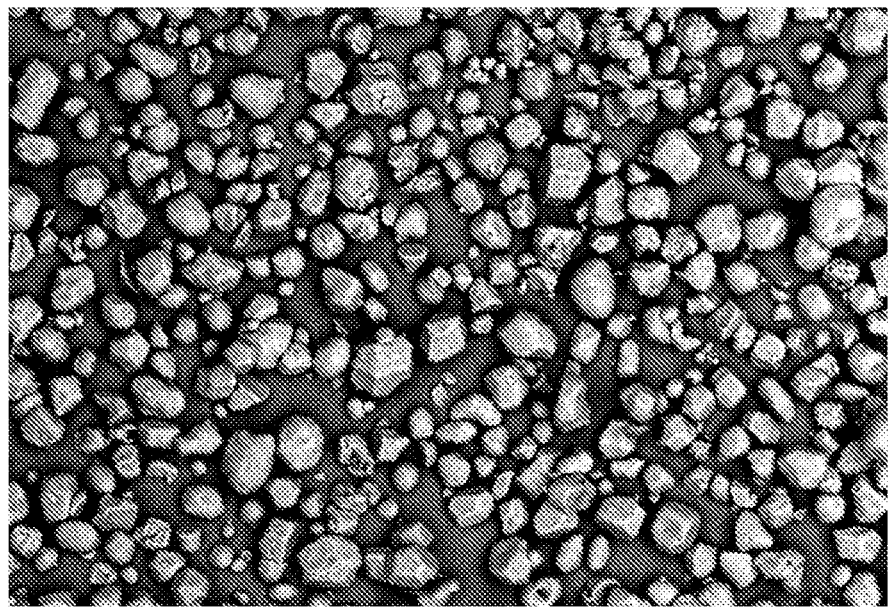
FIG. 7 is a micrograph of the dried product of Sample 4-3.
Figure 8:
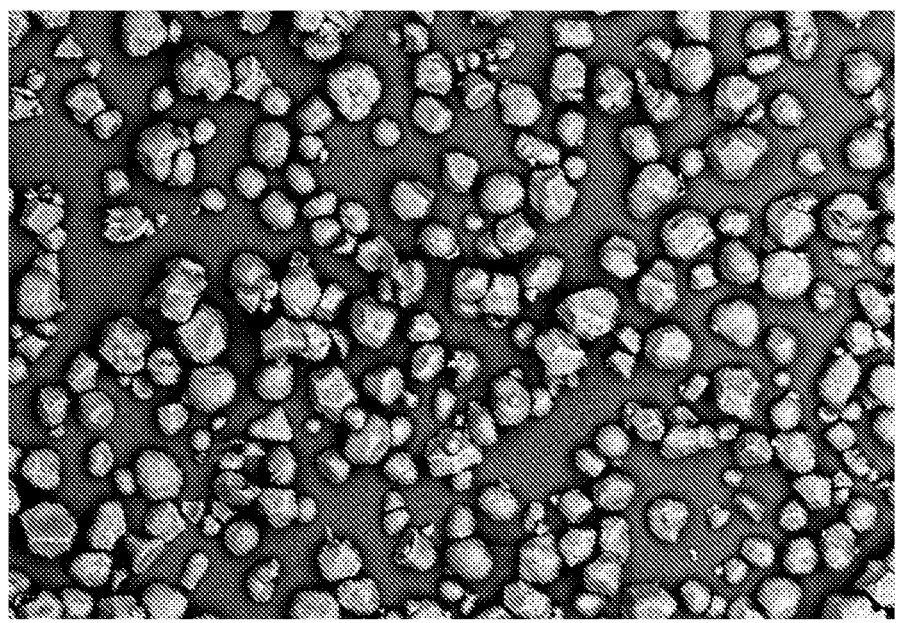
FIG. 8 is a micrograph of the dried product of Sample 4-4.

FIG. 7 is a micrograph of the dried product of Sample 4-3, and FIG. 8 is a micrograph of the dried product of Sample 4-4. Surface pores and pitting are visible on the starch particles. In contrast, FIG. 10 provides a micrograph of the feed starch.

Additional aspects of the disclosure are provided by the enumerated embodiments provided below.

Embodiment 1. A waxy maize starch having
an amylopectin content in the range of 90-100%;
wherein the amylopectin fraction of the waxy maize starch has
at least 26.0% DP3-12 branches; and
no more than 53.0% DP13-24 branches.

Embodiment 2. The waxy maize starch according to embodiment 1, wherein the amylopectin fraction of the waxy maize starch has in the range of 26.0-55.0% DP3-12 branches, e.g., in the range of 26.0-52.5%, or in the range of 26.0-50.0%, or in the range of 26.0-47.5%, or in the range of 26.0-43.0%.

Embodiment 3. The waxy maize starch according to embodiment 1, wherein the amylopectin fraction of the waxy maize starch has at least 26.5% DP3-12 branches, e.g., in the range of 26.5-55.0%, or in the range of 26.5-52.5%, or in the range of 26.5-50.0%, or in the range of 26.5-47.5%, or in the range of 26.5-43.0%.

Embodiment 4. The waxy maize starch according to embodiment 1, wherein the amylopectin fraction of the waxy maize starch has at least 27.5% DP3-12 branches, e.g., in the range of 27.5-55.0%, or in the range of 27.5-52.5%, or in the range of 27.5-50.0%, or in the range of 27.5-47.5%, or in the range of 27.5-43.0%.

Embodiment 5. The waxy maize starch according to embodiment 1, wherein the amylopectin fraction of the waxy maize starch has at least 29.0% DP3-12 branches, e.g., in the range of 29.0-55.0%, or in the range of 29.0-52.5%, or in the range of 29.0-50.0%, or in the range of 29.0-47.5%, or in the range of 29.0-43.0%.

Embodiment 6. The waxy maize starch according to embodiment 1, wherein the amylopectin fraction of the waxy maize starch has at least 32.0% DP3-12 branches, e.g., in the range of 32.0-55.0%, or in the range of 32.0-52.5%, or in the range of 32.0-50.0%, or in the range of 32.0-47.5%, or in the range of 32.0-43.0%.

Embodiment 7. The waxy maize starch according to any of embodiments 1-6, wherein the amylopectin fraction of the waxy maize starch has at least 24.0% DP6-12 branches, e.g., in the range of 24.0-35.0%, or in the range of 24.0-34.0%, or in the range of 24.0-33.0%, or in the range of 24.0-32.0%, or in the range of 24.0-31.0%, or in the range of 24.0-30.0%.

Embodiment 8. The waxy maize starch according to any of embodiments 1-6, wherein the amylopectin fraction of the waxy maize starch has at least 24.5% DP6-12 branches, e.g., in the range of 24.5-35.0%, or in the range of 24.5-34.0%, or in the range of 24.5-33.0%, or in the range of 24.5-32.0%, or in the range of 24.5-31.0%, or in the range of 24.5-30.0%.

Embodiment 9. The waxy maize starch according to any of embodiments 1-6, wherein the amylopectin fraction of the waxy maize starch has at least 25.0% DP6-12 branches, e.g., in the range of 25.0-35.0%, or in the range of 25.0-34.0%, or in the range of 25.0-33.0%, or in the range of 25.0-32.0%, or in the range of 25.0-31.0%, or in the range of 25.0-30.0%.

Embodiment 10. The waxy maize starch according to any of embodiments 1-6, wherein the amylopectin fraction of the waxy maize starch has at least 26.0% DP6-12 branches, e.g., in the range of 26.0-35.0%, or in the range of 26.0-34.0%, or in the range of 26.0-33.0%, or in the range of 26.0-32.0%, or in the range of 26.0-31.0%, or in the range of 26.0-30.0%.

Embodiment 11. The waxy maize starch according to any of embodiments 1-6, wherein the amylopectin fraction of the waxy maize starch has at least 27.5 DP6-12 branches, e.g., in the range of 27.5-35.0%, or in the range of 27.5-34.0%, or in the range of 27.5-33.0%, or in the range of 27.5-32.0%, or in the range of 27.5-31.0%, or in the range of 27.5-30.0%.

Embodiment 12. The waxy maize starch according to any of embodiments 1-6, wherein the amylopectin fraction of the waxy maize starch has at least 29.5% DP6-12 branches, e.g., in the range of 29.5-35.0%, or in the range of 29.5-34.0%, or in the range of 29.5-33.0%, or in the range of 29.5-32.0%, or in the range of 29.5-31.0%.

Embodiment 13. The waxy maize starch according to any of embodiments 1-12, wherein the amylopectin fraction of the waxy maize starch has at least 1.0% DP3-5 branches, e.g., in the range of 1.0-33.0%, or in the range of 1.0-30.0%, or in the range of 1.0-25.0%, or in the range of 1.0-20.0%.

Embodiment 14. The waxy maize starch according to any of embodiments 1-12, wherein the amylopectin fraction of the waxy maize starch has at least 3.0% DP3-5 branches, e.g., in the range of 3.0-33.0%, or the range of 3.0-30.0%, or in the range of 3.0-25.0%, or in the range of 3.0-20.0%.

Embodiment 15. The waxy maize starch according to any of embodiments 1-12, wherein the amylopectin fraction of the waxy maize starch has at least 5.0% DP3-5 branches, e.g., in the range of 5.0-33.0%, or in the range of 5.0-30.0%, or in the range of 5.0-25.0%, or in the range of 5.0-20.0%.

Embodiment 16. The waxy maize starch according to any of embodiments 1-12, wherein the amylopectin fraction of the waxy maize starch has at least 10.0% DP3-5 branches, e.g., in the range of 10.0-33.0%, or in the range of 10.0-30.0%, or in the range of 10.0-25.0%, or in the range of 10.0-20.0%.

Embodiment 17. The waxy maize starch according to any of embodiments 1-16, wherein the amylopectin fraction of the waxy maize starch has in the range of 15.0-53.0% DP13-24 branches, e.g., in the range of 20.0-53.0%, or in the range of 25.0-53.0%, or in the range of 30.0-53.0%.

Embodiment 18. The waxy maize starch according to any of embodiments 1-16, wherein the amylopectin fraction of the waxy maize starch has no more than 51.0% DP13-24 branches, e.g., in the range of 15.0-51.0%, or in the range of 20.0-51.0%, or in the range of 25.0-51.0%, or in the range of 30.0-51.0%.

Embodiment 19. The waxy maize starch according to any of embodiments 1-16, wherein the amylopectin fraction of the waxy maize starch has no more than 50.0% DP13-24 branches, e.g., in the range of 15.0-50.0%, or in the range of 20.0-50.0%, or in the range of 25.0-50.0%, or in the range of 30.0-50.0%.

Embodiment 20 The waxy maize starch according to any of embodiments 1-16, wherein the amylopectin fraction of the waxy maize starch has no more than 47.5% DP13-24 branches, e.g., in the range of 15.0-47.5%, or in the range of 20.0-47.5%, or in the range of 25.0-47.5%, or in the range of 30.0-47.5%.

Embodiment 21. The waxy maize starch according to any of embodiments 1-16, wherein the amylopectin fraction of the waxy maize starch has no more than 43.0% DP13-24 branches, e.g., in the range of 15.0-43.0%, or in the range of 20.0-43.0%, or in the range of 25.0-43.0%, or in the range of 30.0-43.0%.

Embodiment 22. The waxy maize starch according to any of embodiments 1-16, wherein the amylopectin fraction of the waxy maize starch has no more than 38.0% DP13-24 branches, e.g., in the range of 15.0-38.0%, or in the range of 20.0-38.0%, or in the range of 25.0-38.0%, or in the range of 30.0-38.0%.

Embodiment 23. The waxy maize starch according to any of embodiments 1-22, wherein the amylopectin fraction of the waxy maize starch has no more than 19.0% DP25-36 branches, for example, no more than 18.5%

DP25-36 branches, e.g., in the range of 5.0-19.0%, or in the range of 7.5-19.0%, or in the range of 10.0-19.0%, or in the range of 12.5-19.0%, or in the range of 5.0-18.5%, or in the range of 7.5-18.5%, or in the range of 10.0-18.5%, or in the range of 12.5-18.5%.

Embodiment 24. The waxy maize starch according to any of embodiments 1-22, wherein the amylopectin fraction of the waxy maize starch has no more than 18.0% DP25-36 branches, for example, no more than 17.5% DP25-36 branches, e.g., in the range of 5.0-18.0%, or in the range of 7.5-18.0%, or in the range of 10.0-18.0%, or in the range of 12.5-18.0%, or in the range of 5.0-17.5%, or in the range of 7.5-17.5%, or in the range of 10.0-17.5%, or in the range of 12.5-17.5%.

Embodiment 25. The waxy maize starch according to any of embodiments 1-22, wherein the amylopectin fraction of the waxy maize starch has no more than 17.0% DP25-36 branches, for example, no more than 16.5% DP25-36 branches, e.g., in the range of 5.0-17.0%, or in the range of 7.5-17.0%, or in the range of 10.0-17.0%, or in the range of 12.5-17.0%, or in the range of 5.0-16.5%, or in the range of 7.5-16.5%, or in the range of 10.0-16.5% or in the range of 12.5-16.5%.

Embodiment 26. The waxy maize starch according to any of embodiments 1-22, wherein the amylopectin fraction of the waxy maize starch has no more than 16.0% DP25-36 branches.

Embodiment 27. The waxy maize starch according to any of embodiments 1-22, wherein the amylopectin fraction of the waxy maize starch has in the range of 5.0-16.0% DP25-36 branches, e.g., in the range of 7.5-16.0%, or in the range of 10.0-16.0%, or in the range of 12.5-16.0%.

Embodiment 28. The waxy maize starch according to an of embodiments 1-22, wherein the amylopectin fraction of the waxy maize starch has no more than 15.5% DP25-36 branches, e.g., in the range of 5.0-15.5%, or in the range of 7.5-15.5%, or in the range of 10.0-15.5%, or in the range of 12.5-15.5%.

Embodiment 29. The waxy maize starch according to any of embodiments 1-22, wherein the amylopectin fraction of the waxy maize starch has no more than 15.0% DP25-36 branches, e.g., in the range of 5.0-15.0%, or in the range of 7.5-15.0%, or in the range of 10.0-15.0%, or in the range of 12.5-15.0%.

Embodiment 30. The waxy maize starch according to any of embodiments 1-22, wherein the amylopectin fraction of the waxy maize starch has no more than 13.5% DP25-36 branches, e.g., in the range of 5.0-13.5%, or in the range of 7.5-13.5%, or in the range of 10.0-13.5%, or in the range of 12.5-13.5%.

Embodiment 31. A waxy maize starch having an amylopectin content of 90-100% (for example, a waxy maize starch as described with respect to any of embodiments 1-30 wherein the amylopectin fraction has
  a DP3-12 value that is at least 1.0 percentage point greater than the DP3-12 value for native waxy maize starch; and
  a DP13-24 value that is at least 1.0 percentage point less than the DP13-24 value for native waxy maize starch.

Embodiment 32. A waxy maize starch according to embodiment 31, having a DP25-36 value that is at least 0.5 percentage points less than the DP25-36 value for native waxy maize starch.

Embodiment 33. The waxy maize starch according to embodiment 31 or embodiment 32, wherein the amylopectin fraction has
  a DP3-12 value that is at least 2.0 percentage points greater than the DP3-12 value for native waxy maize starch; and
  a DP13-24 value that is at least 2.0 percentage points less than the DP13-24 value for native waxy maize starch.

Embodiment 34. The waxy maize starch according to embodiment 33, wherein the amylopectin fraction has a DP25-36 value that is at least 1.0 percentage point less than the DP25-36 value for native waxy maize starch.

Embodiment 35. The waxy maize starch according to embodiment 31 or embodiment 32, wherein the amylopectin fraction has
  a DP3-12 value that is at least 3.0 percentage points greater than the DP3-12 value for native waxy maize starch; and
  a DP13-24 value that is at least 3.0 percentage points less than the DP13-24 value for native waxy maize starch.

Embodiment 36. The waxy maize starch according to embodiment 35, wherein the amylopectin fraction has a DP25-36 value that is at least 2.0 percentage points less than the DP25-36 value for native waxy maize starch.

Embodiment 37. The waxy maize starch according to embodiment 31 or embodiment 32, wherein the amylopectin fraction has
  a DP3-12 value that is at least 5.0 percentage points greater than the DP3-12 value for native waxy maize starch; and
  a DP13-24 value that is at least 5.0 percentage points less than the DP13-24 value for native waxy maize starch.

Embodiment 38. The waxy maize starch according to embodiment 30, wherein the amylopectin fraction has a DP25-36 value that is at least 3.0 percentage points less than the DP25-36 value for native waxy maize starch.

Embodiment 39. The waxy maize starch according to any of embodiments 1-38, having an amylopectin content in the range of 95-100%.

Embodiment 40. The waxy maize starch according to any of embodiments 1-38, having an amylopectin content of at least 99%.

Embodiment 41. The waxy maize starch according to any of embodiments 1-38, having an amylopectin content of at least 99.9%.

Embodiment 42. The waxy maize starch according to any of embodiments 1-41, having a weight-average molecular weight of at least 800,000 Da, e.g., at least 1,000,000 Da.

Embodiment 43. The waxy maize starch according to any of embodiments 1-41, having a weight-average molecular weight of at least 1,500,000 Da, e.g., at least 2,000,000 Da.

Embodiment 44. The waxy maize starch according to any of embodiments 1-43, wherein the waxy maize starch is inhibited and has a sedimentation volume of less than 70 mL/g, e.g., in the range of 10-70 mL/g.

Embodiment 45. The waxy maize starch according to any of embodiments 1-43, wherein the waxy maize starch is inhibited and has a sedimentation volume of less than 60 mL/g, e.g., in the range of 10-60 mL/g.

Embodiment 46. The waxy maize starch according to any of embodiments 1-43, wherein the waxy maize starch is inhibited and has a sedimentation volume of less than 50 mL/g, e.g., in the range of 10-50 mL/g.

Embodiment 47. The waxy maize starch according to embodiment 44, having a sedimentation volume in the range of 15-40 mL/g.

Embodiment 48. The waxy maize starch according to embodiment 44, having a sedimentation volume in the range of 13-35 mL/g.

Embodiment 49. The waxy maize starch according to embodiment 44, having a sedimentation volume in the range of 10-40 mL/g, or 10-35 mL/g, or 15-50 mL/g, or 15-35 mL/g, or 18-50 mL/g, or 18-40 mL/g, or 10-45 mL/g, or 10-30 mL/g, or 10-25 mL/g, or 10-20 mL/g, or 15-45 mL/g, or 15-30 mL/g, or 15-25 mL/g, or 15-20 mL/g, or 20-50 mL/g, or 20-45 mL/g, or 20-40 mL/g, or 20-35 mL/g, or 20-30 mL/g, or 20-25 mL/g, or 25-50 mL/g, or 25-45 mL/g, or 25-40 mL/g, or 25-35 mL/g, or 25-30 mL/g, or 30-50 mL/g, or 30-45 mL/g, or 30-40 mL/g, or 30-35 mL/g, or 35-50 mL/g, or 35-45 mL/g, or 35-40 mL/g, or 40-50 mL/g.

Embodiment 50. The waxy maize starch according to any of embodiments 1-49, having no more than 25% solubles, e.g., no more than 22% solubles.

Embodiment 51. The waxy maize starch according to any of embodiments 1-49, having no more than 20% solubles e.g., no more than 18% solubles or no more than 15% solubles.

Embodiment 52. The waxy maize starch according to any of embodiments 1-51, having a relatively low color, i.e., a Yellowness Index of no more than 10.

Embodiment 53. The waxy maize starch according to any of embodiments 1-51, having a relatively low color, i.e. a Yellowness Index of 3-10 or 5-10.

Embodiment 54. The waxy maize starch according to any of embodiments 1-51, having an especially low color, i.e., a Yellowness Index of no more than 8.

Embodiment 55. The waxy maize starch according to any of embodiments 1-54, wherein the waxy maize starch is not hydroxypropylated.

Embodiment 56. The waxy maize starch according to any of embodiments 1-55, wherein the waxy maize starch is not acetylated.

Embodiment 57. The waxy maize starch according to any of embodiments 1-56, wherein the waxy maize starch is not carboxymethylated.

Embodiment 58. The waxy maize starch according to any of embodiments 1-57, wherein the waxy maize starch is not hydroxyethylated.

Embodiment 59. The waxy maize starch according to any of embodiments 1-58, wherein the waxy maize starch is not phosphated.

Embodiment 60. The waxy maize starch according to any of embodiments 1-59, wherein the waxy maize starch is not succinated (e.g., not octenylsuccinated).

Embodiment 61. The waxy maize starch according to any of embodiments 1-60, wherein the waxy maize starch is not cationic or zwitterionic.

Embodiment 62. The waxy maize starch according to any of embodiments 1-61, wherein the waxy maize starch is not crosslinked with phosphate.

Embodiment 63. The waxy maize starch according to any of embodiments 1-62, wherein the waxy maize starch is not crosslinked with adipate.

Embodiment 64. The waxy maize starch according to any of embodiments 1-63, wherein the waxy maize starch is not crosslinked with epichlorohydrin.

Embodiment 65. The waxy maize starch according to any of embodiments 1-64, wherein the waxy maize starch is not crosslinked with acrolein.

Embodiment 66. The waxy maize starch according to any of embodiments 1-65, wherein the waxy maize starch is not bleached or oxidized with peroxide or hypochlorite.

Embodiment 67. The waxy maize starch according to any of embodiments 1-43, 2-54, and 66, wherein the waxy maize starch is not inhibited or modified.

Embodiment 68. The waxy maize starch according to any of embodiments 1-43 and 50-66, wherein the waxy maize starch is not inhibited.

Embodiment 69. The waxy maize starch according to any of embodiments 1-66, wherein one or more of the chemical modifications and/or inhibitions described in embodiments 54-65 is present.

Embodiment 70. The waxy maize starch according to any of embodiments 1-54, wherein none of the chemical modifications and/or inhibitions described in embodiments 54-65 is present.

Embodiment 71. The waxy maize starch according to any of embodiments 1-70, wherein the waxy maize starch is not dextrinized.

Embodiment 72. The waxy maize starch according to any of embodiments 1-71, wherein the waxy maize starch substantially lacks 1,2- and 1,3-branching.

Embodiment 73. The waxy maize starch according to any of embodiments 1-72, wherein the waxy maize starch has a viscosity in the range of 50-1500 cP in an RVA test, e.g., a viscosity in the range of 50-1000 cP, 50-850 cP, 50-700 cP, 50-500 cP, 50-400 cP, 50-300 cP, 50-200 cP, 100-1100 cP, 100-1000 cP, 100-850 cP, 100-700 cP, 100-500 cP, 100-400 cP, 100-300 cP, 200-1100 cP, 200-1000 cP, 200-850 cP, 200-700 cP, 200-500 cP, 400-1100 cP, 400-1000 cP, 400-850 cP, 400-700 cP, 600-1100 cP, 600-850 cP, 700-1500 cP, or 700-1300 cP in an RVA test.

Embodiment 74. The waxy maize starch according to any of embodiments 1-73, wherein the waxy maize starch is pregelatinized.

Embodiment 75. The waxy maize starch according to embodiment 74, made by a process comprising gelatinizing and drying a waxy maize starch according to embodiment 66.

Embodiment 76. The waxy maize starch according to any of embodiments 1-75 wherein no more than 30% of the starch granules (e.g., no more than 20% or no more than 10% of the starch granules) become non-intact upon cooking.

Embodiment 77. The waxy maize starch according to any of embodiments 1-76, having less than 10% fiber.

Embodiment 78. The waxy maize starch according to any of embodiments 1-77, having a graininess of 4 or less after two freeze-thaw cycles.

Embodiment 79. The waxy maize starch according to any of embodiments 1-78, having a syneresis of 5 or less, or even 3 or less after two freeze-thaw cycles.

Embodiment 80. The waxy maize starch according to any of embodiments 1-79, having a change in firmness of no more than 2 after two freeze-thaw cycles.

Embodiment 81. The waxy maize starch according to any of embodiments 1-80, having a change in clarity of no more than 4 after two freeze-thaw cycles.

Embodiment 82. The waxy maize starch according to any of embodiments 1-81, having good digestive tolerance.

Embodiment 83. The waxy maize starch according to any of embodiments 1-82, provided in a composition comprising the waxy maize starch in a concentration of at least 50 wt % on a dry solids basis (e.g., at least 75 wt % on a dry solids basis, at least 90 wt % on a dry solids basis, or even at least 98 wt % on a dry solids basis).

Embodiment 84. A method for making a waxy maize starch (e.g., according to any of embodiments 1 the method comprising:
providing a waxy maize starch; and
treating the waxy maize starch in aqueous media with an exo-hydrolyzing enzyme.

Embodiment 85. The method according to embodiment 84, wherein the exo-hydrolyzing enzyme is a beta amylase.

Embodiment 86. The method according to embodiment 84, wherein the exo-hydrolyzing enzyme is a maltogenic alpha amylase, a maltotetraose-forming α-amylase (EC 3.2.1.60); a maltohexaose-forming α-amylase (EC 3.2.1.98); a maltotriose-forming α-amylase (EC 3.2.1.116); or a maltopentaose-forming α-amylase (EC 3.2.1.-).

Embodiment 87. The method according to embodiment 84, wherein the exo-hydrolyzing enzyme is a glucoamylase or a cyclodextrin glucanotransferase.

Embodiment 88. The method according to any of embodiments 84-87, wherein the enzyme treatment is performed in aqueous media at a temperature in the range of 30-70° C.

Embodiment 89. The method according to any of embodiments 84-88, wherein the enzyme treatment is performed in aqueous media at an enzyme concentration in the range of 0.001-3%.

Embodiment 90. The method according to any of embodiments 84-89, wherein the enzyme treatment is performed for a time in the range of 10-600 minute.

Embodiment 91. The method according to any of embodiments 84-90, wherein the method further includes cooking the waxy starch in aqueous media before the enzyme treatment.

Embodiment 92. The method according to any of embodiments 84-91, wherein the waxy maize starch is substantially uncooked when the enzyme treatment is performed.

Embodiment 93 The method according to any of embodiments 84-92, further comprising, after treatment with the exo-hydrolyzing enzyme, washing the treated waxy maize starch with aqueous media to provide the waxy maize starch with less than 1 wt % (e.g., less than 0.5 wt %, or even less than 0.1%) maltose on a dry solids basis.

Embodiment 94. The method according to any of embodiments 84-93, wherein the treatment with the exo-hydrolyzing enzyme is performed to:
increase the DP3-12 value of the waxy maize starch by at least 1.0 percentage point; and
reduce the DP1-24 value of the waxy maize starch by at least 1.0 percentage point.

Embodiment 95. The method according to embodiment 87, wherein the treatment with the exo-hydrolyzing enzyme is performed to reduce the DP25-36 value of the waxy maize, starch by at least 0.5 percentage points.

Embodiment 96. The method according to any of embodiments 84-93, wherein the treatment with the exo-hydrolyzing enzyme is performed to:
increase the DP3-12 value of the waxy maize starch by at least 2.0 percentage points; and
reduce the DP13-24 value of the waxy maize starch by at least 2.0 percentage points.

Embodiment 97. The method according to embodiment 96, wherein the treatment with the exo-hydrolyzing enzyme is performed to reduce the DP25-36 value of the waxy maize starch by at least 1.0 percentage point.

Embodiment 98. The method according to any of embodiments 84-93, wherein the treatment with the exo-hydrolyzing enzyme is performed to:
increase the DP3-12 value of the waxy maize starch by at least 3.0 percentage points; and
reduce the DP13-24 value of the waxy maize starch by at least 3.0 percentage points.

Embodiment 99. The method according to embodiment 98, wherein the treatment with the exo-hydrolyzing enzyme is performed to reduce the DP25-36 value of the waxy maize starch by at least 2.0 percentage points.

Embodiment 100. The method according to any of embodiments 84-93 wherein the treatment with the exo-hydrolyzing enzyme is performed to:
increase the DP3-12 value of the waxy maize starch by at least 5.0 percentage points;
reduce the DP13-24 value of the waxy maize starch by at least 5.0 percentage points.

Embodiment 101. The method according to embodiment 100, wherein the treatment with the exo-hydrolyzing enzyme is performed to reduce the DP25-36 value of the waxy maize starch by at least 3.0 percentage points.

Embodiment 102. A waxy maize starch made by a method according to any of embodiments 84-101.

Embodiment 103. A waxy maize starch according to any of embodiments 1-83, made by a method according to any of embodiments 84-101.

Embodiment 104. A method for making a food product, comprising cooking waxy maize starch according to any of embodiments 1-83, 102 and 103 in the presence of water, and providing the cooked starch in combination with one or more other food ingredients.

Embodiment 105. The method according to embodiment 104, comprising combining the starch with the one or more other food ingredients that include water, and cooking the combination of the starch and the food ingredients.

Embodiment 106. The method according to embodiment 104 or embodiment 105, wherein the cooking comprises pasteurization, retorting, kettle or batch cooking, high temperature short time treatment, or ultra-high temperature processing.

Embodiment 107. The method of embodiment 104 or embodiment 105, wherein the cooking comprises baking.

Embodiment 108. A method for making a food product, comprising providing a waxy maize starch according to any of embodiments 1-83, 102 and 103; and combining the waxy maize starch with one or more food ingredients.

Embodiment 109. A method according to claim 108, wherein the waxy maize starch is pregelatinized.

Embodiment 110. A food product including a waxy maize starch according to any of embodiments 1-83, 102 and 103, in a cooked form.

Embodiment 111. The method or food product of any of embodiments 104-110, wherein the food product is a tomato-based product, a gravy, a sauce such as a white sauce or cheese sauce, a soup, a pudding, a salad dressing (e.g., pourable or spoonable), a yogurt, a sour cream, a pudding, a custard, a cheese product, a fruit filling or topping, a cream filling or topping, a syrup (e.g., a lite syrup), a beverage (e.g., a dairy-based beverage), a glaze, a condiment, a confectionary, a pasta, a frozen food, a cereal, or a soup.

Embodiment 112. The method or food product of any of embodiments 104-110, wherein the food product is a baked good, e.g., a bread, a pastry, a pie crust, a donut, a cake, a biscuit, a cookie, a cracker, or a muffin.

Embodiment 113. The method or food product of any of embodiments 104-110, wherein the food product is selected from thermally-processed foods, acid foods, dry mixes, refrigerated foods, frozen foods, extruded foods, oven-prepared foods, stove top-cooked food microwaveable foods, full-fat or fat-reduced foods, and foods having a low water activity.

Embodiment 114. The method or food product of any of embodiments 104-110, wherein the food product is selected from high acid foods (pH <3.7) such as fruit-based pie fillings, baby foods, and the like; acid foods (pH 3.7-4.5) such as tomato-based products, low acid foods (pH >4.5) such as gravies, sauces, and soups; stove top-cooked foods such as sauces, gravies, and puddings; instant foods such as puddings; pourable and spoonable salad dressings; refrigerated foods such as dairy or imitation dairy products (e.g., yogurt, sour cream, and cheese); frozen foods such as frozen desserts and dinners; microwaveable foods such as frozen dinners; liquid products such as diet products and hospital foods.

Embodiment 115. The method or food product of any of embodiments 104-110, wherein the food product is selected from baked foods, breakfast cereal, anhydrous coatings (e.g., ice cream compound coating, chocolate), dairy products, confections, jams and jellies, beverages, fillings, extruded and sheeted snacks, gelatin desserts, snack bars, cheese and cheese sauces, edible and water-soluble films, soups, syrups, sauces, dressings, creamers, icings, frostings, glazes, tortillas, meat and fish, dried fruit, infant and toddler food, and batters and breadings.

Embodiment 116. The method or food product of any of embodiments 104-110, wherein the food product is a medical food.

Embodiment 117. The method or food product of any of embodiments 104-110, wherein the food product is a pet food.

Embodiment 118. A dry mix comprising a waxy maize starch according to any of embodiments 1-63, 102 and 103 in admixture with one or more additional dry food ingredients.

Embodiment 119. The dry mix according to embodiment 118, wherein the dry mix is a dry mix for preparing a product selected from baked goods, gravies, sauces, puddings, baby foods, hot cereals; or is a dry mix for predusting foods prior to batter cooking and frying.

What is claimed is:

1. A method for making an enzyme-treated, inhibited waxy maize starch having an amylopectin content in the range of 90-100% and a sedimentation volume of no more than 50 mL/g, wherein the amylopectin fraction of the enzyme-treated waxy, inhibited maize starch has at least 26.0% DP3-12 branches; and no more than 53.0% DP13-24 branches, the method comprising:
providing an inhibited waxy maize feed starch; and
treating the inhibited waxy maize feed starch in aqueous media with an exo-hydrolyzing enzyme that is a beta amylase, a maltogenic alpha amylase, a maltotetraose-forming α-amylase (EC 3.2.1.60); a maltohexaose-forming α-amylase (EC 3.2.1.98); a maltotriose-forming α-amylase (EC 3.2.1.116); a maltopentaose-forming α-amylase (EC 3.2.1.-), a glucoamylase or a cyclodextrin glucanotransferase.

2. The method according to claim 1, wherein the method further includes cooking the inhibited waxy maize feed starch in aqueous media before the enzyme treatment.

3. The method according to claim 1, wherein the treatment with the exo-hydrolyzing enzyme is performed to:
increase the DP3-12 value of the inhibited waxy maize feed starch by at least 3.0 percentage points;
reduce the DP13-24 value of the inhibited waxy maize feed starch by at least 3.0 percentage points.

4. An enzyme-treated, inhibited waxy maize starch made by a method according to claim 1.

5. A method for making a food product, comprising cooking the enzyme-treated, inhibited waxy maize starch according to claim 4 in the presence of water, and providing the cooked enzyme-treated inhibited starch in combination with one or more other food ingredients.

6. A method for making a food product, comprising providing an enzyme-treated inhibited waxy maize starch according to claim 4; and combining the enzyme-treated, inhibited waxy maize starch with one or more food ingredients.

7. A food product including an enzyme-treated, inhibited waxy maize starch according to claim 4, in a cooked form.

8. A food product according to claim 7, wherein the food product is a gravy, a sauce, a soup, a pudding, a salad dressing a yogurt, a sour cream, a pudding, a custard, a fruit filling or topping, or a cream filling or topping.

9. The method according to claim 1, wherein the method further includes, after treatment with the exo-hydrolyzing enzyme, washing the enzyme-treated, inhibited waxy maize starch with aqueous media to provide the waxy maize starch with less than 1 wt % maltose on a dry solids basis.

10. The method according to claim 1, wherein the treatment with the exo-hydrolyzing enzyme is performed to reduce the DP25-36 value of the inhibited waxy maize feed starch by at least 2.0 percentage points.

11. The method according to claim 1, wherein the amylopectin fraction of the enzyme-treated waxy maize starch has in the range of 27.5-47.5% DP3-12 branches and in the range of 30.0-50.0% DP13-24 branches.

12. The method according to claim 1, wherein the amylopectin fraction of the waxy maize starch has at in the range of 32.0-50.0% DP3-12 branches and 25.0-47.5% DP13-24 branches.

13. The method according to claim 1, wherein the amylopectin fraction of the waxy maize starch has at least 24.0% DP6-12 branches and in the range of 3.0-25.0% DP3-5 branches.

14. The method according to claim 1, wherein the amylopectin fraction of the waxy maize starch has in the range of 25.0-32.0% DP6-12 branches and in the range of 5.0-25.0% DP3-5 branches.

15. The method according to claim 1, wherein the amylopectin fraction of the waxy maize starch has no more than 16.0% DP25-36 branches.

16. The method according to claim 1, wherein the inhibited enzyme-treated waxy maize starch has a sedimentation volume in the range of 10-40 mL/g.

17. The method according to claim 1, wherein the inhibited enzyme-treated waxy maize starch is not hydroxypropylated, is not acetylated, is not carboxymethylated, is not hydroxyethylated, is not phosphated, is not succinated, is not cationic or zwitterionic, is not crosslinked with phosphate, is not crosslinked with adipate, is not crosslinked with epichlorohydrin, is not crosslinked with acrolein, and is not bleached or oxidized with peroxide or hypochlorite.

18. The method according to claim 1, wherein
the enzyme-treated inhibited waxy maize starch has a sedimentation volume in the range of 10-40 mL/g; and
the amylopectin fraction of the enzyme-treated inhibited waxy maize starch has
in the range of 27.5-47.5% DP3-12 branches;
in the range of 30.0-50.0% DP13-24 branches;
at least 24.0% DP6-12 branches; and
in the range of 3.0-25.0% DP3-5 branches.

19. The method according to claim 1, wherein
the enzyme-treated inhibited waxy maize starch has a sedimentation volume in the range of 10-40 mL/g; and
the amylopectin fraction of the enzyme-treated inhibited waxy maize starch has
in the range of 32.0-50.0% DP3-12 branches;
in the range of 25.0-47.5% DP13-24 branches;
in the range of 25.0-32.0% DP6-12 branches; and
in the range of 5.0-25.0% DP3-5 branches.

20. A method for making an enzyme-treated, inhibited waxy maize starch having
an amylopectin content in the range of 90-100%;
and a sedimentation volume of no more than 50 mL/g,
the method comprising:
providing an inhibited waxy maize feed starch; and
treating the inhibited waxy maize starch in aqueous media with an exo-hydrolyzing enzyme that is a beta amylase, a maltogenic alpha amylase, a maltotetraose-forming α-amylase (EC 3.2.1.60); a maltohexaose-forming α-amylase (EC 3.2.1.98); a maltotriose-forming α-amylase (EC 3.2.1.116); a maltopentaose-forming α-amylase (EC 3.2.1.-), a glucoamylase or a cyclodextrin glucanotransferase,
wherein the treatment with the exo-hydrolyzing enzyme is performed to:
increase the DP3-12 value of the inhibited waxy maize feed starch by at least 3.0 percentage points;
reduce the DP13-24 value of the inhibited waxy maize feed starch by at least 3.0 percentage points.

\* \* \* \* \*